United States Patent
Futawatari

(10) Patent No.: US 8,112,562 B2
(45) Date of Patent: Feb. 7, 2012

(54) PATH CHANGEOVER SUPPORT DEVICE AND METHOD

(75) Inventor: Naoki Futawatari, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 386 days.

(21) Appl. No.: 12/309,099

(22) PCT Filed: Dec. 11, 2008

(86) PCT No.: PCT/JP2008/003725
§ 371 (c)(1),
(2), (4) Date: Jan. 7, 2009

(87) PCT Pub. No.: WO2010/067403
PCT Pub. Date: Jun. 17, 2010

(65) Prior Publication Data
US 2010/0306575 A1    Dec. 2, 2010

(51) Int. Cl.
*G06F 3/00* (2006.01)
(52) U.S. Cl. ............... 710/38; 710/15; 710/17; 710/19; 710/74; 714/2; 714/5.1
(58) Field of Classification Search .............. None
See application file for complete search history.

(56) References Cited

U.S. PATENT DOCUMENTS

| 2003/0172331 | A1 | 9/2003 | Cherian et al. |
| 2005/0237927 | A1* | 10/2005 | Kano et al. .............. 370/216 |
| 2006/0274647 | A1* | 12/2006 | Wang et al. .............. 370/216 |
| 2007/0055797 | A1* | 3/2007 | Shimozono .............. 710/36 |
| 2007/0248017 | A1 | 10/2007 | Hinata et al. |

FOREIGN PATENT DOCUMENTS

| EP | 1 674 983 A1 | 7/2005 |
| EP | 1 901 522 A1 | 3/2007 |
| JP | 2007-287064 | 4/2006 |

OTHER PUBLICATIONS

International Search Report dated Aug. 20, 2009.

* cited by examiner

*Primary Examiner* — Eron J Sorrell
(74) *Attorney, Agent, or Firm* — Hitachi America, Ltd

(57) ABSTRACT

Port management information is prepared for managing information related to the status of each of a plurality of ports possessed by a storage system in a unified manner. Change of the status related to any one of a plurality of ports from "normal" to anomalous is detected. For a subject external device which is using the anomalous path as an I/O path, a "normal" port is selected, on the basis of the port management information, from one or more ports related to one or more paths which are being used as alternate paths. And information related to this "normal" port which has been selected is notified to the subject external device. During path changeover, the subject external device selects as an I/O path an alternate path which is related to the "normal" port specified from the notified information.

12 Claims, 31 Drawing Sheets

FIG.4

| | | A | B | C | D | E | F | G | H | TOTAL NUMBER OF PATHS (TNOP) |
|---|---|---|---|---|---|---|---|---|---|---|
| HOST (9) (H(9)) | PATH FAULT FLAG | | | | | | | | | |
| | I/O EXECUTION PORT FLAG | | ON | | | | | | | |
| | I/O EXECUTION PRIORITY | 5 | 6 | 1 | | 2 | 3 | 4 | | 6 |
| HOST (8) (H(8)) | PATH FAULT FLAG | ON | | | | | | | | |
| | I/O EXECUTION PORT FLAG | | ON | | | | | | | |
| | I/O EXECUTION PRIORITY | 6 | 1 | 2 | | 3 | 4 | 5 | | 6 |
| HOST (7) (H(7)) 1251 | PATH FAULT FLAG | | | | | | | | | |
| | I/O EXECUTION PORT FLAG | ON | | | | | | | | |
| | I/O EXECUTION PRIORITY | 1 | 2 | 3 | | 4 | 5 | 6 | | 6 |
| HOST (6) (H(6)) | PATH FAULT FLAG | | | | | | | | | |
| | I/O EXECUTION PORT FLAG | | | | | | ON | | | |
| | I/O EXECUTION PRIORITY | | | 2 | | | 1 | | | 2 |
| HOST (5) (H(5)) | PATH FAULT FLAG | | | | | | | | | |
| | I/O EXECUTION PORT FLAG | | | | | ON | | | | |
| | I/O EXECUTION PRIORITY | | 2 | | | 1 | | | | 2 |
| HOST (4) (H(4)) | PATH FAULT FLAG | | | | | | | | | |
| | I/O EXECUTION PORT FLAG | | | | | ON | | | | |
| | I/O EXECUTION PRIORITY | 2 | | | | 1 | | | | 2 |
| HOST (3) (H(3)) | PATH FAULT FLAG | | | | | | | | | |
| | I/O EXECUTION PORT FLAG | | ON | | | | | | | |
| | I/O EXECUTION PRIORITY | | 1 | | | | 2 | | | 2 |
| HOST (2) (H(2)) | PATH FAULT FLAG | | | | | | | | | |
| | I/O EXECUTION PORT FLAG | ON | | | | | | | | |
| | I/O EXECUTION PRIORITY | 1 | | | | 2 | | | | 2 |
| HOST (1) (H(1)) | PATH FAULT FLAG | | | | | | | | | |
| | I/O EXECUTION PORT FLAG | ON | | | | | | | | |
| | I/O EXECUTION PRIORITY | 1 | | | 2 | | | 2 | | 2 |
| NUMBER OF I/O HOSTS (NOIH) | | 2 | 2 | 2 | 1 | 1 | 1 | | | |
| PORT STATUS | | 0 | 1 | 0 | | 2 | 2 | 2 | 2 | |
| PORT | | A | B | C | D | E | F | G | H | |

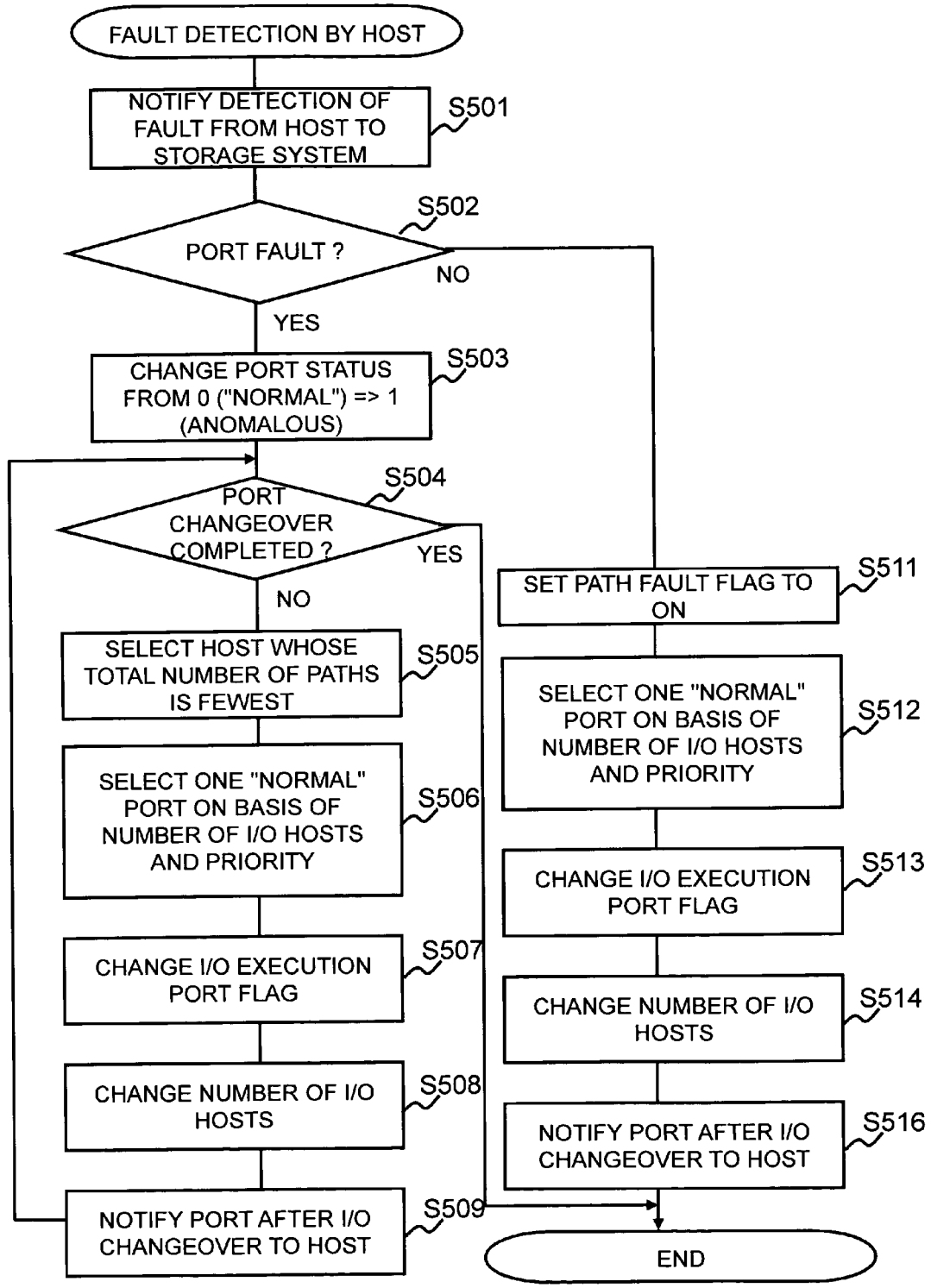

FIG.6A

| PORT | NOIH | PORT STATUS | H(1) PRIORITY | H(1) PORT FLAG | H(1) PATH FLAG | H(2) PRIORITY | H(2) PORT FLAG | H(2) PATH FLAG | H(3) PRIORITY | H(3) PORT FLAG | H(3) PATH FLAG | H(4) PRIORITY | H(4) PORT FLAG | H(4) PATH FLAG | H(5) PRIORITY | H(5) PORT FLAG | H(5) PATH FLAG | H(6) PRIORITY | H(6) PORT FLAG | H(6) PATH FLAG | H(7) PRIORITY | H(7) PORT FLAG | H(7) PATH FLAG | H(8) PRIORITY | H(8) PORT FLAG | H(8) PATH FLAG | H(9) PRIORITY | H(9) PORT FLAG | H(9) PATH FLAG |
|---|---|---|---|---|---|---|---|---|---|---|---|---|---|---|---|---|---|---|---|---|---|---|---|---|---|---|---|---|---|
| A | 0 | 2 | 1 | ON | | | | | | | | 2 | | | | | | | | | 1 | ON | | 6 | | | 5 | | |
| B | 0 | 2 | | | | 1 | ON | | | | | | | | | | | 2 | | | | | | 2 | | | 1 | ON | | 6 | | |
| C | 0 | 2 | | | | | | | 1 | ON | | | | | | | | | | | 2 | | | 3 | | | 2 | | | 1 | ON |
| D | | | | | | | | | | | | | | | | | | | | | | | | | | | | | |
| E | 0 | 1 | 2 | | | | | | | | | | | | 1 | ON | | | | | | | | 4 | | | 3 | | | 2 | | |
| F | 0 | 1 | | | | 2 | | | | | | | | | | | | 1 | ON | | | | | 5 | | | 4 | | | 3 | | |
| G | 0 | 1 | | | | | | | 2 | | | | | | | | | | | | 1 | ON | | 6 | | | 5 | | | 4 | | |
| H | | | | | | | | | | | | | | | | | | | | | | | | | | | | | |
| TNOP | | | 2 | | | 2 | | | 2 | | | 2 | | | 2 | | | 2 | | | 6 | | | 6 | | | 6 | | |

FIG.6B

| PORT | NOIH | PORT STATUS | H(1) PRIORITY | H(1) PORT FLAG | H(1) PATH FLAG | H(2) PRIORITY | H(2) PORT FLAG | H(2) PATH FLAG | H(3) PRIORITY | H(3) PORT FLAG | H(3) PATH FLAG | H(4) PRIORITY | H(4) PORT FLAG | H(4) PATH FLAG | H(5) PRIORITY | H(5) PORT FLAG | H(5) PATH FLAG | H(6) PRIORITY | H(6) PORT FLAG | H(6) PATH FLAG | H(7) PRIORITY | H(7) PORT FLAG | H(7) PATH FLAG | H(8) PRIORITY | H(8) PORT FLAG | H(8) PATH FLAG | H(9) PRIORITY | H(9) PORT FLAG | H(9) PATH FLAG |
|---|---|---|---|---|---|---|---|---|---|---|---|---|---|---|---|---|---|---|---|---|---|---|---|---|---|---|---|---|---|
| A | *1* | 2 | 1 | ON | | | | | | | | 2 | | | | | | | | | 1 | ON | | 6 | | | 5 | | |
| B | 0 | 2 | | | | 1 | ON | | | | | | | | | | | 2 | | | | | | 2 | | | 1 | ON | | 6 | | |
| C | 0 | 2 | | | | | | | 1 | ON | | | | | | | | | | | 2 | | | 3 | | | 2 | | | 1 | ON |
| D | | | | | | | | | | | | | | | | | | | | | | | | | | | | | |
| E | 0 | 1 | 2 | | | | | | | | | | | | 1 | ON | | | | | | | | 4 | | | 3 | | | 2 | | |
| F | 0 | 1 | | | | 2 | | | | | | | | | | | | 1 | ON | | | | | 5 | | | 4 | | | 3 | | |
| G | 0 | 1 | | | | | | | 2 | | | | | | | | | | | | 1 | ON | | 6 | | | 5 | | | 4 | | |
| H | | | | | | | | | | | | | | | | | | | | | | | | | | | | | |
| TNOP | | | 2 | | | 2 | | | 2 | | | 2 | | | 2 | | | 2 | | | 6 | | | 6 | | | 6 | | |

| PORT | PORT STATUS | NOIH | H(1) PRIORITY | H(1) PORT FLAG | H(1) PATH FLAG | H(2) PRIORITY | H(2) PORT FLAG | H(2) PATH FLAG | H(3) PRIORITY | H(3) PORT FLAG | H(3) PATH FLAG | H(4) PRIORITY | H(4) PORT FLAG | H(4) PATH FLAG | H(5) PRIORITY | H(5) PORT FLAG | H(5) PATH FLAG | H(6) PRIORITY | H(6) PORT FLAG | H(6) PATH FLAG | H(7) PRIORITY | H(7) PORT FLAG | H(7) PATH FLAG | H(8) PRIORITY | H(8) PORT FLAG | H(8) PATH FLAG | H(9) PRIORITY | H(9) PORT FLAG | H(9) PATH FLAG |
|---|---|---|---|---|---|---|---|---|---|---|---|---|---|---|---|---|---|---|---|---|---|---|---|---|---|---|---|---|---|
| A | 1 | 2 | 1 |   |   |   |   |   | 2 |   |   |   |   |   |   |   |   |   |   |   | 1 |   |   | 6 |   |   | 5 |   |   |
| B | 0 | 2 |   |   |   | 1 |   | ON |   |   |   | 2 |   |   |   |   |   |   |   |   | 2 |   |   | 1 |   | ON | 6 |   |   |
| C | 0 | 2 |   |   |   |   |   |   | 1 |   | ON |   |   |   |   |   |   | 2 |   |   | 3 |   |   | 2 |   |   | 1 |   | ON |
| D |   |   |   |   |   |   |   |   |   |   |   |   |   |   |   |   |   |   |   |   |   |   |   |   |   |   |   |   |   |
| E | 0 | 1 | 2 |   | ON |   |   |   |   |   |   |   |   |   | 1 |   | ON |   |   |   | 4 |   |   | 3 |   |   | 2 |   |   |
| F | 0 | 1 |   |   |   | 2 |   |   |   |   |   |   |   |   |   |   |   | 1 |   | ON | 5 |   |   | 4 |   |   | 3 |   |   |
| G | 0 | 1 |   |   |   |   |   |   | 2 |   |   |   |   |   |   |   |   | 1 |   | ON | 6 |   |   | 5 |   |   | 4 |   |   |
| H |   |   |   |   |   |   |   |   |   |   |   |   |   |   |   |   |   |   |   |   |   |   |   |   |   |   |   |   |   |
| TNOP |   |   | 2 |   |   | 2 |   |   | 2 |   |   | 2 |   |   | 2 |   |   | 2 |   |   | 6 |   |   | 6 |   |   | 6 |   |   |

| PORT | PORT STATUS | NOIH | H(1) PRIORITY | H(1) PORT FLAG | H(1) PATH FLAG | H(2) PRIORITY | H(2) PORT FLAG | H(2) PATH FLAG | H(3) PRIORITY | H(3) PORT FLAG | H(3) PATH FLAG | H(4) PRIORITY | H(4) PORT FLAG | H(4) PATH FLAG | H(5) PRIORITY | H(5) PORT FLAG | H(5) PATH FLAG | H(6) PRIORITY | H(6) PORT FLAG | H(6) PATH FLAG | H(7) PRIORITY | H(7) PORT FLAG | H(7) PATH FLAG | H(8) PRIORITY | H(8) PORT FLAG | H(8) PATH FLAG | H(9) PRIORITY | H(9) PORT FLAG | H(9) PATH FLAG |
|---|---|---|---|---|---|---|---|---|---|---|---|---|---|---|---|---|---|---|---|---|---|---|---|---|---|---|---|---|---|
| A | 1 | *1* | 1 |   |   |   |   |   | 2 |   |   |   |   |   |   |   |   |   |   |   | 1 |   |   | 6 |   |   | 5 |   |   |
| B | 0 | 2 |   |   |   | 1 |   | ON |   |   |   | 2 |   |   |   |   |   |   |   |   | 2 |   |   | 1 |   | ON | 6 |   |   |
| C | 0 | 2 |   |   |   |   |   |   | 1 |   | ON |   |   |   |   |   |   | 2 |   |   | 3 |   |   | 2 |   |   | 1 |   | ON |
| D |   |   |   |   |   |   |   |   |   |   |   |   |   |   |   |   |   |   |   |   |   |   |   |   |   |   |   |   |   |
| E | 0 | *2* | 2 |   | ON |   |   |   |   |   |   |   |   |   | 1 |   | ON |   |   |   | 4 |   |   | 3 |   |   | 2 |   |   |
| F | 0 | 1 |   |   |   | 2 |   |   |   |   |   |   |   |   |   |   |   | 1 |   | ON | 5 |   |   | 4 |   |   | 3 |   |   |
| G | 0 | 1 |   |   |   |   |   |   | 2 |   |   |   |   |   |   |   |   | 1 |   | ON | 6 |   |   | 5 |   |   | 4 |   |   |
| H |   |   |   |   |   |   |   |   |   |   |   |   |   |   |   |   |   |   |   |   |   |   |   |   |   |   |   |   |   |
| TNOP |   |   | 2 |   |   | 2 |   |   | 2 |   |   | 2 |   |   | 2 |   |   | 2 |   |   | 6 |   |   | 6 |   |   | 6 |   |   |

| PORT | PORT STATUS | NOIH | H(1) PRIORITY | H(1) PATH FLAG | H(2) PRIORITY | H(2) PATH FLAG | H(3) PRIORITY | H(3) PATH FLAG | H(4) PRIORITY | H(4) PATH FLAG | H(5) PRIORITY | H(5) PATH FLAG | H(6) PRIORITY | H(6) PATH FLAG | H(7) PRIORITY | H(7) PATH FLAG | H(8) PRIORITY | H(8) PATH FLAG | H(9) PRIORITY | H(9) PATH FLAG |
|---|---|---|---|---|---|---|---|---|---|---|---|---|---|---|---|---|---|---|---|---|
| A | 1 | 1 | 1 | | | | | | 2 | | | | | | 1 | | 6 | | 5 | |
| B | 0 | 2 | | | 1 | ON | | | | | 2 | | | | 2 | | | ON | 6 | |
| C | 0 | 2 | | | | | 1 | ON | | | | | 2 | | 3 | | 2 | | 1 | ON |
| D | | | | | | | | | | | | | | | | | | | | |
| E | 0 | 2 | 2 | ON | | | | | 1 | ON | | | | | 4 | | 3 | | 2 | |
| F | 0 | 1 | | | 2 | | | | | | 1 | ON | | | 5 | ON | 4 | | 3 | |
| G | 0 | 1 | | | | | 2 | | | | | | 1 | ON | 6 | | 5 | | 4 | |
| H | | | | | | | | | | | | | | | | | | | | |
| TNOP | | | 2 | | 2 | | 2 | | 2 | | 2 | | 2 | | 6 | | 6 | | 6 | |

| PORT | PORT STATUS | NOIH | H(1) PRIORITY | H(1) PATH FLAG | H(2) PRIORITY | H(2) PATH FLAG | H(3) PRIORITY | H(3) PATH FLAG | H(4) PRIORITY | H(4) PATH FLAG | H(5) PRIORITY | H(5) PATH FLAG | H(6) PRIORITY | H(6) PATH FLAG | H(7) PRIORITY | H(7) PATH FLAG | H(8) PRIORITY | H(8) PATH FLAG | H(9) PRIORITY | H(9) PATH FLAG |
|---|---|---|---|---|---|---|---|---|---|---|---|---|---|---|---|---|---|---|---|---|
| A | 1 | | 1 | | | | | | 2 | | | | | | 1 | | 6 | | 5 | |
| B | 0 | 2 | | | 1 | ON | | | | | 2 | | | | 2 | | 1 | ON | 6 | |
| C | 0 | 2 | | | | | 1 | ON | | | | | 2 | | 3 | | 2 | | 1 | ON |
| D | | | | | | | | | | | | | | | | | | | | |
| E | 0 | 2 | 2 | ON | | | | | 1 | ON | | | | | 4 | | 3 | | 2 | |
| F | 0 | 2 | | | 2 | | | | | | 1 | ON | | | 5 | ON | 4 | | 3 | |
| G | 0 | 1 | | | | | 2 | | | | | | 1 | ON | 6 | | 5 | | 4 | |
| H | | | | | | | | | | | | | | | | | | | | |
| TNOP | | | 2 | | 2 | | 2 | | 2 | | 2 | | 2 | | 6 | | 6 | | 6 | |

FIG.9A

| PORT | PORT STATUS | NOIH | H(1) PRIORITY | H(1) PORT FLAG | H(1) PATH FLAG | H(2) PRIORITY | H(2) PORT FLAG | H(2) PATH FLAG | H(3) PRIORITY | H(3) PORT FLAG | H(3) PATH FLAG | H(4) PRIORITY | H(4) PORT FLAG | H(4) PATH FLAG | H(5) PRIORITY | H(5) PORT FLAG | H(5) PATH FLAG | H(6) PRIORITY | H(6) PORT FLAG | H(6) PATH FLAG | H(7) PRIORITY | H(7) PORT FLAG | H(7) PATH FLAG | H(8) PRIORITY | H(8) PORT FLAG | H(8) PATH FLAG | H(9) PRIORITY | H(9) PORT FLAG | H(9) PATH FLAG |
|---|---|---|---|---|---|---|---|---|---|---|---|---|---|---|---|---|---|---|---|---|---|---|---|---|---|---|---|---|---|
| A | 0 | 2 | 1 | ON | ON | | | | | | | 2 | | | | | | | | | 1 | ON | | 6 | | | 5 | | |
| B | 0 | 2 | | | | 1 | ON | | | | | 2 | | | | | | | | | 2 | | | 1 | ON | | 6 | | |
| C | 0 | 2 | | | | | | | 1 | ON | | | | | | | | 2 | | | 3 | | | 2 | | | 1 | ON | |
| D | | | | | | | | | | | | | | | | | | | | | | | | | | | | | |
| E | 0 | 1 | 2 | | | | | | | | | 1 | ON | | | | | | | | 4 | | | 3 | | | 2 | | |
| F | 0 | 1 | | | | 2 | | | | | | | | | 1 | ON | | | | | 5 | | | 4 | | | 3 | | |
| G | 0 | 1 | | | | | | | 2 | | | | | | | | | 1 | ON | | 6 | | | 5 | | | 4 | | |
| H | | | | | | | | | | | | | | | | | | | | | | | | | | | | | |
| TNOP | | | 2 | | | 2 | | | 2 | | | 2 | | | 2 | | | 2 | | | 6 | | | 6 | | | 6 | | |

FIG.9B

| PORT | PORT STATUS | NOIH | H(1) PRIORITY | H(1) PORT FLAG | H(1) PATH FLAG | H(2) PRIORITY | H(2) PORT FLAG | H(2) PATH FLAG | H(3) PRIORITY | H(3) PORT FLAG | H(3) PATH FLAG | H(4) PRIORITY | H(4) PORT FLAG | H(4) PATH FLAG | H(5) PRIORITY | H(5) PORT FLAG | H(5) PATH FLAG | H(6) PRIORITY | H(6) PORT FLAG | H(6) PATH FLAG | H(7) PRIORITY | H(7) PORT FLAG | H(7) PATH FLAG | H(8) PRIORITY | H(8) PORT FLAG | H(8) PATH FLAG | H(9) PRIORITY | H(9) PORT FLAG | H(9) PATH FLAG |
|---|---|---|---|---|---|---|---|---|---|---|---|---|---|---|---|---|---|---|---|---|---|---|---|---|---|---|---|---|---|
| A | 1 | 2 | 1 | ON | | | | | | | | 2 | | | | | | | | | 1 | ON | | 6 | | | 5 | | |
| B | 0 | 2 | | | | 1 | ON | | | | | 2 | | | | | | | | | 2 | | | 1 | ON | | 6 | | |
| C | 0 | 2 | | | | | | | 1 | ON | | | | | | | | 2 | | | 3 | | | 2 | | | 1 | ON | |
| D | | | | | | | | | | | | | | | | | | | | | | | | | | | | | |
| E | 0 | 1 | 2 | | ON | | | | | | | 1 | ON | | | | | | | | 4 | | | 3 | | | 2 | | |
| F | 0 | 1 | | | | 2 | | | | | | | | | 1 | ON | | | | | 5 | | | 4 | | | 3 | | |
| G | 0 | 1 | | | | | | | 2 | | | | | | | | | 1 | ON | | 6 | | | 5 | | | 4 | | |
| H | | | | | | | | | | | | | | | | | | | | | | | | | | | | | |
| TNOP | | | 2 | | | 2 | | | 2 | | | 2 | | | 2 | | | 2 | | | 6 | | | 6 | | | 6 | | |

FIG.10

| PORT | PORT STATUS | NOIH | H(1) | | | H(2) | | | H(3) | | | H(4) | | | H(5) | | | H(6) | | | H(7) | | | H(8) | | | H(9) | | |
|---|---|---|---|---|---|---|---|---|---|---|---|---|---|---|---|---|---|---|---|---|---|---|---|---|---|---|---|---|---|
| | | | PRIORITY | PORT FLAG | PATH FLAG | PRIORITY | PORT FLAG | PATH FLAG | PRIORITY | PORT FLAG | PATH FLAG | PRIORITY | PORT FLAG | PATH FLAG | PRIORITY | PORT FLAG | PATH FLAG | PRIORITY | PORT FLAG | PATH FLAG | PRIORITY | PORT FLAG | PATH FLAG | PRIORITY | PORT FLAG | PATH FLAG | PRIORITY | PORT FLAG | PATH FLAG |
| A | 0 | *1* | 1 | | ON | | | | | | | 2 | | | | | | | | | 1 | | ON | 6 | | | 5 | | |
| B | 0 | 2 | | | | 1 | | ON | | | | | | | 2 | | | | | | 2 | | | 1 | | ON | 6 | | |
| C | 0 | 2 | | | | | | | 1 | | ON | | | | | | | 2 | | | 3 | | | 2 | | | 1 | | ON |
| D | | | | | | | | | | | | | | | | | | | | | | | | | | | | | |
| E | 0 | *2* | 2 | | ON | | | | | | | 1 | | ON | | | | | | | 4 | | | 3 | | | 2 | | |
| F | 0 | 1 | | | | 2 | | | | | | | | | 1 | | ON | | | | 5 | | | 4 | | | 3 | | |
| G | 0 | 1 | | | | | | | 2 | | | | | | | | | 1 | | ON | 6 | | | 5 | | | 4 | | |
| H | | | | | | | | | | | | | | | | | | | | | | | | | | | | | |
| TNOP | | | 2 | | | 2 | | | 2 | | | 2 | | | 2 | | | 2 | | | 6 | | | 6 | | | 6 | | |

| PORT | PORT STATUS | NOIH | H(1) PRIORITY | H(1) PORT FLAG | H(1) PATH FLAG | H(2) PRIORITY | H(2) PORT FLAG | H(2) PATH FLAG | H(3) PRIORITY | H(3) PORT FLAG | H(3) PATH FLAG | H(4) PRIORITY | H(4) PORT FLAG | H(4) PATH FLAG | H(5) PRIORITY | H(5) PORT FLAG | H(5) PATH FLAG | H(6) PRIORITY | H(6) PORT FLAG | H(6) PATH FLAG | H(7) PRIORITY | H(7) PORT FLAG | H(7) PATH FLAG | H(8) PRIORITY | H(8) PORT FLAG | H(8) PATH FLAG | H(9) PRIORITY | H(9) PORT FLAG | H(9) PATH FLAG |
|---|---|---|---|---|---|---|---|---|---|---|---|---|---|---|---|---|---|---|---|---|---|---|---|---|---|---|---|---|---|
| A | 0 | 2 | 1 | ON | | | | | | | | 2 | | | | | | | | | 1 | | | 6 | | | 5 | | |
| B | 0 | 2 | | | | 1 | ON | | | | | | | | | | | 2 | | | 2 | | | 1 | ON | | 6 | | |
| C | 0 | 2 | | | | | | | 1 | ON | | | | | | | | 2 | | | 3 | | | 2 | | | 1 | ON | |
| D | | | | | | | | | | | | | | | | | | | | | | | | | | | | | |
| E | 0 | 1 | 2 | | | | | | | | | 1 | ON | | | | | | | | 4 | | | 3 | | | 2 | | |
| F | 0 | 1 | | | | 2 | | | | | | | | | 1 | ON | | | | | 5 | | | 4 | | | 3 | | |
| G | 0 | 1 | | | | | | | 2 | | | | | | | | | 1 | ON | | 6 | | | 5 | | | 4 | | |
| H | | | | | | | | | | | | | | | | | | | | | | | | | | | | | |
| TNOP | | | 2 | | | 2 | | | 2 | | | 2 | | | 2 | | | 2 | | | 6 | | | 6 | | | 6 | | |

| PORT | PORT STATUS | NOIH | H(1) PRIORITY | H(1) PORT FLAG | H(1) PATH FLAG | H(2) PRIORITY | H(2) PORT FLAG | H(2) PATH FLAG | H(3) PRIORITY | H(3) PORT FLAG | H(3) PATH FLAG | H(4) PRIORITY | H(4) PORT FLAG | H(4) PATH FLAG | H(5) PRIORITY | H(5) PORT FLAG | H(5) PATH FLAG | H(6) PRIORITY | H(6) PORT FLAG | H(6) PATH FLAG | H(7) PRIORITY | H(7) PORT FLAG | H(7) PATH FLAG | H(8) PRIORITY | H(8) PORT FLAG | H(8) PATH FLAG | H(9) PRIORITY | H(9) PORT FLAG | H(9) PATH FLAG |
|---|---|---|---|---|---|---|---|---|---|---|---|---|---|---|---|---|---|---|---|---|---|---|---|---|---|---|---|---|---|
| A | 0 | 2 | 1 | ON | | | | | | | | 2 | | | | | | | | | 1 | | | 6 | | | 5 | | |
| B | *1* | 2 | | | | 1 | ON | | | | | | | | | | | 2 | | | 2 | | | 1 | ON | | 6 | | |
| C | 0 | 2 | | | | | | | 1 | ON | | | | | | | | 2 | | | 3 | | | 2 | | | 1 | ON | |
| D | | | | | | | | | | | | | | | | | | | | | | | | | | | | | |
| E | 0 | 1 | 2 | | | | | | | | | 1 | ON | | | | | | | | 4 | | | 3 | | | 2 | | |
| F | 0 | 1 | | | | 2 | | | | | | | | | 1 | ON | | | | | 5 | | | 4 | | | 3 | | |
| G | 0 | 1 | | | | | | | 2 | | | | | | | | | 1 | ON | | 6 | | | 5 | | | 4 | | |
| H | | | | | | | | | | | | | | | | | | | | | | | | | | | | | |
| TNOP | | | 2 | | | 2 | | | 2 | | | 2 | | | 2 | | | 2 | | | 6 | | | 6 | | | 6 | | |

FIG.13A

| PORT | PORT STATUS | NOIH | H(1) PRIORITY | H(1) PORT FLAG | H(1) PATH FLAG | H(2) PRIORITY | H(2) PORT FLAG | H(2) PATH FLAG | H(3) PRIORITY | H(3) PORT FLAG | H(3) PATH FLAG | H(4) PRIORITY | H(4) PORT FLAG | H(4) PATH FLAG | H(5) PRIORITY | H(5) PORT FLAG | H(5) PATH FLAG | H(6) PRIORITY | H(6) PORT FLAG | H(6) PATH FLAG | H(7) PRIORITY | H(7) PORT FLAG | H(7) PATH FLAG | H(8) PRIORITY | H(8) PORT FLAG | H(8) PATH FLAG | H(9) PRIORITY | H(9) PORT FLAG | H(9) PATH FLAG |
|---|---|---|---|---|---|---|---|---|---|---|---|---|---|---|---|---|---|---|---|---|---|---|---|---|---|---|---|---|---|
| A | 0 | 2 | 1 | ON | | | | | | | | 2 | | | | | | | | | 1 | | | 6 | | | 5 | | |
| B | 1 | 2 | | | | 1 | | | | | | | | | 2 | | | | | | 2 | | | 1 | ON | | 6 | | |
| C | 0 | 2 | | | | | | | 1 | ON | | | | | 2 | | | | | | 2 | | | 2 | | | 1 | ON | |
| D | | | | | | | | | | | | | | | | | | | | | | | | | | | | | |
| E | 0 | 1 | 2 | | | | | | | | | 1 | ON | | | | | | | | 4 | | | 3 | | | 2 | | |
| F | 0 | 1 | | | | 2 | ON | | | | | | | | 1 | ON | | | | | 5 | | | 4 | | | 3 | | |
| G | 0 | 1 | | | | 2 | | | | | | 2 | | | | | | 1 | ON | | 6 | | | 5 | | | 4 | | |
| H | | | | | | | | | | | | | | | | | | | | | | | | | | | | | |
| TNOP | | | 2 | | | 2 | | | 2 | | | 2 | | | 2 | | | 2 | | | 6 | | | 6 | | | 6 | | |

FIG.13B

| PORT | PORT STATUS | NOIH | H(1) PRIORITY | H(1) PORT FLAG | H(1) PATH FLAG | H(2) PRIORITY | H(2) PORT FLAG | H(2) PATH FLAG | H(3) PRIORITY | H(3) PORT FLAG | H(3) PATH FLAG | H(4) PRIORITY | H(4) PORT FLAG | H(4) PATH FLAG | H(5) PRIORITY | H(5) PORT FLAG | H(5) PATH FLAG | H(6) PRIORITY | H(6) PORT FLAG | H(6) PATH FLAG | H(7) PRIORITY | H(7) PORT FLAG | H(7) PATH FLAG | H(8) PRIORITY | H(8) PORT FLAG | H(8) PATH FLAG | H(9) PRIORITY | H(9) PORT FLAG | H(9) PATH FLAG |
|---|---|---|---|---|---|---|---|---|---|---|---|---|---|---|---|---|---|---|---|---|---|---|---|---|---|---|---|---|---|
| A | 0 | 2 | 1 | ON | | | | | | | | 2 | | | | | | | | | 1 | | | 6 | | | 5 | | |
| B | 1 | *1* | | | | 1 | | | | | | | | | 2 | | | | | | 2 | | | 1 | ON | | 6 | | |
| C | 0 | 2 | | | | | | | 1 | ON | | | | | 2 | | | | | | 2 | | | 2 | | | 1 | ON | |
| D | | | | | | | | | | | | | | | | | | | | | | | | | | | | | |
| E | 0 | 1 | 2 | | | | | | | | | 1 | ON | | | | | | | | 4 | | | 3 | | | 2 | | |
| F | 0 | *2* | | | | 2 | ON | | | | | | | | 1 | ON | | | | | 5 | | | 4 | | | 3 | | |
| G | 0 | 1 | | | | | | | 2 | | | | | | | | | 1 | ON | | 6 | | | 5 | | | 4 | | |
| H | | | | | | | | | | | | | | | | | | | | | | | | | | | | | |
| TNOP | | | 2 | | | 2 | | | 2 | | | 2 | | | 2 | | | 2 | | | 6 | | | 6 | | | 6 | | |

| PORT | PORT STATUS | NOIH | H(1) | | | H(2) | | | H(3) | | | H(4) | | | H(5) | | | H(6) | | | H(7) | | | H(8) | | | H(9) | | |
|---|---|---|---|---|---|---|---|---|---|---|---|---|---|---|---|---|---|---|---|---|---|---|---|---|---|---|---|---|---|
| | | | PRIORITY | PORT FLAG | PATH FLAG | PRIORITY | PORT FLAG | PATH FLAG | PRIORITY | PORT FLAG | PATH FLAG | PRIORITY | PORT FLAG | PATH FLAG | PRIORITY | PORT FLAG | PATH FLAG | PRIORITY | PORT FLAG | PATH FLAG | PRIORITY | PORT FLAG | PATH FLAG | PRIORITY | PORT FLAG | PATH FLAG | PRIORITY | PORT FLAG | PATH FLAG |
| A | 0 | 2 | 1 | ON | | | | | | | | 2 | | | | | | | | | 1 | | | 6 | | | 5 | | |
| B | 1 | 1 | | | | 1 | | | | | | | | | 2 | | | | | | 2 | | | 1 | ON | | 6 | | |
| C | 0 | 2 | | | | | | | 1 | ON | | | | | | | | 2 | | | 3 | | | 2 | | | 1 | ON | |
| D | | | | | | | | | | | | | | | | | | | | | | | | | | | | | |
| E | 0 | 1 | 2 | | | | | | | | | | | | 1 | ON | | | | | 4 | | | 3 | | ON | 2 | | |
| F | 0 | 2 | | | | 2 | ON | | | | | | | | | | | 1 | ON | | 5 | | | 4 | | | 3 | | |
| G | 0 | 1 | | | | | | | 2 | | | | | | | | | 1 | ON | | 6 | | | 5 | | | 4 | | |
| H | | | | | | | | | | | | | | | | | | | | | | | | | | | | | |
| TNOP | | | 2 | | | 2 | | | 2 | | | 2 | | | 2 | | | 2 | | | 6 | | | 6 | | | 6 | | |

| PORT | PORT STATUS | NOIH | H(1) | | | H(2) | | | H(3) | | | H(4) | | | H(5) | | | H(6) | | | H(7) | | | H(8) | | | H(9) | | |
|---|---|---|---|---|---|---|---|---|---|---|---|---|---|---|---|---|---|---|---|---|---|---|---|---|---|---|---|---|---|
| | | | PRIORITY | PORT FLAG | PATH FLAG | PRIORITY | PORT FLAG | PATH FLAG | PRIORITY | PORT FLAG | PATH FLAG | PRIORITY | PORT FLAG | PATH FLAG | PRIORITY | PORT FLAG | PATH FLAG | PRIORITY | PORT FLAG | PATH FLAG | PRIORITY | PORT FLAG | PATH FLAG | PRIORITY | PORT FLAG | PATH FLAG | PRIORITY | PORT FLAG | PATH FLAG |
| A | 0 | 2 | 1 | ON | | | | | | | | 2 | | | | | | | | | 1 | | | 6 | | | 5 | | |
| B | 1 | | | | | 1 | | | | | | | | | 2 | | | | | | 2 | | | 1 | | | 6 | | |
| C | 0 | 2 | | | | | | | 1 | ON | | | | | | | | 2 | | | 3 | | | 2 | | | 1 | ON | |
| D | | | | | | | | | | | | | | | | | | | | | | | | | | | | | |
| E | 0 | 2 | 2 | | | | | | | | | | | | 1 | ON | | | | | 4 | | | 3 | | ON | 2 | | |
| F | 0 | 2 | | | | 2 | ON | | | | | | | | | | | 1 | ON | | 5 | | | 4 | | | 3 | | |
| G | 0 | 1 | | | | | | | 2 | | | | | | | | | 1 | ON | | 6 | | | 5 | | | 4 | | |
| H | | | | | | | | | | | | | | | | | | | | | | | | | | | | | |
| TNOP | | | 2 | | | 2 | | | 2 | | | 2 | | | 2 | | | 2 | | | 6 | | | 6 | | | 6 | | |

| PORT | PORT STATUS | NOIH | H(1) PRIORITY | H(1) PORT FLAG | H(1) PATH FLAG | H(2) PRIORITY | H(2) PORT FLAG | H(2) PATH FLAG | H(3) PRIORITY | H(3) PORT FLAG | H(3) PATH FLAG | H(4) PRIORITY | H(4) PORT FLAG | H(4) PATH FLAG | H(5) PRIORITY | H(5) PORT FLAG | H(5) PATH FLAG | H(6) PRIORITY | H(6) PORT FLAG | H(6) PATH FLAG | H(7) PRIORITY | H(7) PORT FLAG | H(7) PATH FLAG | H(8) PRIORITY | H(8) PORT FLAG | H(8) PATH FLAG | H(9) PRIORITY | H(9) PORT FLAG | H(9) PATH FLAG |
|---|---|---|---|---|---|---|---|---|---|---|---|---|---|---|---|---|---|---|---|---|---|---|---|---|---|---|---|---|---|
| A | 1 | 2 | 1 | ON | | | | | | | | 2 | | | | | | | | | 1 | ON | | 6 | | | 5 | | |
| B | 1 | | | | | 1 | | | | | | | | | 2 | | | | | | 2 | | | 1 | | | 6 | | |
| C | 0 | 2 | | | | | | | 1 | | ON | | | | | | | | | | 2 | | | 3 | | | 2 | | ON |
| D | | | | | | | | | | | | | | | | | | | | | | | | | | | | | |
| E | 0 | 2 | 2 | | | | | | | | | 1 | | ON | | | | | | | | | | 4 | | | 3 | ON | | 2 |
| F | 0 | 2 | | | | 2 | ON | | | | | | | | | | | 1 | ON | | | | | 5 | | | 4 | | | 3 |
| G | 0 | 1 | | | | | | | 2 | | | | | | | | | | | | 1 | ON | | 6 | | | 5 | | | 4 |
| H | | | | | | | | | | | | | | | | | | | | | | | | | | | | | |
| TNOP | | | 2 | | | 2 | | | 2 | | | 2 | | | 2 | | | 2 | | | 6 | | | 6 | | | 6 | | |

| PORT | PORT STATUS | NOIH | H(1) PRIORITY | H(1) PORT FLAG | H(1) PATH FLAG | H(2) PRIORITY | H(2) PORT FLAG | H(2) PATH FLAG | H(3) PRIORITY | H(3) PORT FLAG | H(3) PATH FLAG | H(4) PRIORITY | H(4) PORT FLAG | H(4) PATH FLAG | H(5) PRIORITY | H(5) PORT FLAG | H(5) PATH FLAG | H(6) PRIORITY | H(6) PORT FLAG | H(6) PATH FLAG | H(7) PRIORITY | H(7) PORT FLAG | H(7) PATH FLAG | H(8) PRIORITY | H(8) PORT FLAG | H(8) PATH FLAG | H(9) PRIORITY | H(9) PORT FLAG | H(9) PATH FLAG |
|---|---|---|---|---|---|---|---|---|---|---|---|---|---|---|---|---|---|---|---|---|---|---|---|---|---|---|---|---|---|
| A | 1 | 2 | 1 | | | | | | | | | 2 | | | | | | | | | 1 | ON | | 6 | | | 5 | | |
| B | 1 | | | | | 1 | | | | | | | | | 2 | | | | | | 2 | | | 1 | | | 6 | | |
| C | 0 | 2 | | | | | | | 1 | | ON | | | | | | | | | | 2 | | | 3 | | | 2 | | ON |
| D | | | | | | | | | | | | | | | | | | | | | | | | | | | | | |
| E | 0 | 2 | 2 | | ON | | | | | | | 1 | | ON | | | | | | | | | | 4 | | | 3 | ON | | 2 |
| F | 0 | 2 | | | | 2 | ON | | | | | | | | | | | 1 | ON | | | | | 5 | | | 4 | | | 3 |
| G | 0 | 1 | | | | | | | 2 | | | | | | | | | | | | 1 | ON | | 6 | | | 5 | | | 4 |
| H | | | | | | | | | | | | | | | | | | | | | | | | | | | | | |
| TNOP | | | 2 | | | 2 | | | 2 | | | 2 | | | 2 | | | 2 | | | 6 | | | 6 | | | 6 | | |

FIG.16A

| PORT | PORT STATUS | NOIH | H(1) PRI | H(1) PORT FLAG | H(1) PATH FLAG | H(2) PRI | H(2) PORT FLAG | H(2) PATH FLAG | H(3) PRI | H(3) PORT FLAG | H(3) PATH FLAG | H(4) PRI | H(4) PORT FLAG | H(4) PATH FLAG | H(5) PRI | H(5) PORT FLAG | H(5) PATH FLAG | H(6) PRI | H(6) PORT FLAG | H(6) PATH FLAG | H(7) PRI | H(7) PORT FLAG | H(7) PATH FLAG | H(8) PRI | H(8) PORT FLAG | H(8) PATH FLAG | H(9) PRI | H(9) PORT FLAG | H(9) PATH FLAG |
|---|---|---|---|---|---|---|---|---|---|---|---|---|---|---|---|---|---|---|---|---|---|---|---|---|---|---|---|---|---|
| A | 1 | *1* | 1 | | | | | | | | | 2 | | | | | | | | | 1 | ON | | 6 | | | 5 | | |
| B | 1 | | | | | 1 | | | | | | 2 | | | | | | | | | 2 | | | 1 | | | 6 | | |
| C | 0 | 2 | | | | | | | 1 | | ON | | | | | | | | | | 2 | | | 3 | | | 2 | | |
| D | | | | | | | | | | | | | | | | | | | | | | | | | | | | | |
| E | 0 | 3 | 2 | ON | | | | | | | | 1 | | ON | | | | | | | 4 | | | 3 | ON | | 2 | | |
| F | 0 | 2 | | | | 2 | ON | | | | | | | | | | | 1 | ON | | | | | 5 | | | 4 | | 3 |
| G | 0 | 1 | | | | | | | 2 | | | | | | | | | | | | 1 | ON | | 6 | | | 5 | | 4 |
| H | | | | | | | | | | | | | | | | | | | | | | | | | | | | | |
| TNOP | | | 2 | | | 2 | | | 2 | | | 2 | | | 2 | | | 2 | | | 6 | | | 6 | | | 6 | | |

FIG.16B

| PORT | PORT STATUS | NOIH | H(1) PRI | H(1) PORT FLAG | H(1) PATH FLAG | H(2) PRI | H(2) PORT FLAG | H(2) PATH FLAG | H(3) PRI | H(3) PORT FLAG | H(3) PATH FLAG | H(4) PRI | H(4) PORT FLAG | H(4) PATH FLAG | H(5) PRI | H(5) PORT FLAG | H(5) PATH FLAG | H(6) PRI | H(6) PORT FLAG | H(6) PATH FLAG | H(7) PRI | H(7) PORT FLAG | H(7) PATH FLAG | H(8) PRI | H(8) PORT FLAG | H(8) PATH FLAG | H(9) PRI | H(9) PORT FLAG | H(9) PATH FLAG |
|---|---|---|---|---|---|---|---|---|---|---|---|---|---|---|---|---|---|---|---|---|---|---|---|---|---|---|---|---|---|
| A | 1 | 1 | 1 | | | | | | | | | 2 | | | | | | | | | 1 | | | 6 | | | 5 | | |
| B | 1 | | | | | 1 | | | | | | 2 | | | | | | | | | 2 | | | 1 | | | 6 | | |
| C | 0 | 2 | | | | | | | 1 | | ON | | | | | | | | | | 2 | | | 3 | | | 2 | | |
| D | | | | | | | | | | | | | | | | | | | | | | | | | | | | | |
| E | 0 | 3 | 2 | ON | | | | | | | | 1 | | ON | | | | | | | 4 | | | 3 | ON | | 2 | | |
| F | 0 | 2 | | | | 2 | ON | | | | | | | | | | | 1 | ON | | | | | 5 | | | 4 | | 3 |
| G | 0 | 1 | | | | | | | 2 | | | | | | | | | | | | 1 | ON | | 6 | ON | | 5 | | 4 |
| H | | | | | | | | | | | | | | | | | | | | | | | | | | | | | |
| TNOP | | | 2 | | | 2 | | | 2 | | | 2 | | | 2 | | | 2 | | | 6 | | | 6 | | | 6 | | |

FIG.17

| PORT | PORT STATUS | NOIH | H(1) PRIORITY | H(1) PORT FLAG | H(1) PATH FLAG | H(2) PRIORITY | H(2) PORT FLAG | H(2) PATH FLAG | H(3) PRIORITY | H(3) PORT FLAG | H(3) PATH FLAG | H(4) PRIORITY | H(4) PORT FLAG | H(4) PATH FLAG | H(5) PRIORITY | H(5) PORT FLAG | H(5) PATH FLAG | H(6) PRIORITY | H(6) PORT FLAG | H(6) PATH FLAG | H(7) PRIORITY | H(7) PORT FLAG | H(7) PATH FLAG | H(8) PRIORITY | H(8) PORT FLAG | H(8) PATH FLAG | H(9) PRIORITY | H(9) PORT FLAG | H(9) PATH FLAG |
|---|---|---|---|---|---|---|---|---|---|---|---|---|---|---|---|---|---|---|---|---|---|---|---|---|---|---|---|---|---|
| A | 1 |   | 1 |   |   |   |   |   |   |   |   | 2 |   |   |   |   |   |   |   |   | 1 |   |   | 6 |   |   | 5 |   |   |
| B | 1 |   |   |   |   | 1 |   |   |   |   |   |   |   |   | 2 |   |   |   |   |   | 2 |   |   | 1 |   |   | 6 |   |   |
| C | 0 | 2 |   |   |   |   |   |   | 1 |   | ON |   |   |   |   |   |   | 2 |   |   | 3 |   |   | 2 |   |   | 1 |   | ON |
| D |   |   |   |   |   |   |   |   |   |   |   |   |   |   |   |   |   |   |   |   |   |   |   |   |   |   |   |   |   |
| E | 0 | 3 | 2 |   | ON |   |   |   |   |   |   | 1 |   | ON |   |   |   |   |   |   | 4 |   |   | 3 |   | ON | 2 |   |   |
| F | 0 | 2 |   |   |   | 2 |   | ON |   |   |   |   |   |   | 1 |   | ON |   |   |   | 5 |   |   | 4 |   |   | 3 |   |   |
| G | 0 | 2 |   |   |   |   |   |   | 2 |   |   |   |   |   |   |   |   | 1 |   | ON | 6 |   | ON | 5 |   |   | 4 |   |   |
| H |   |   |   |   |   |   |   |   |   |   |   |   |   |   |   |   |   |   |   |   |   |   |   |   |   |   |   |   |   |
| TNOP |   |   | 2 |   |   | 2 |   |   | 2 |   |   | 2 |   |   | 2 |   |   | 2 |   |   | 6 |   |   | 6 |   |   | 6 |   |   |

| PORT | PORT STATUS | NOIH | H(1) PRIORITY | H(1) PORT FLAG | H(1) PATH FLAG | H(2) PRIORITY | H(2) PORT FLAG | H(2) PATH FLAG | H(3) PRIORITY | H(3) PORT FLAG | H(3) PATH FLAG | H(4) PRIORITY | H(4) PORT FLAG | H(4) PATH FLAG | H(5) PRIORITY | H(5) PORT FLAG | H(5) PATH FLAG | H(6) PRIORITY | H(6) PORT FLAG | H(6) PATH FLAG | H(7) PRIORITY | H(7) PORT FLAG | H(7) PATH FLAG | H(8) PRIORITY | H(8) PORT FLAG | H(8) PATH FLAG | H(9) PRIORITY | H(9) PORT FLAG | H(9) PATH FLAG |
|---|---|---|---|---|---|---|---|---|---|---|---|---|---|---|---|---|---|---|---|---|---|---|---|---|---|---|---|---|---|
| A | 1 |   | 1 |   |   |   |   |   |   |   |   | 2 |   |   |   |   |   |   |   |   | 1 |   |   | 6 |   |   | 5 |   |   |
| B | 1 |   |   |   |   | 1 |   |   |   |   |   |   |   |   | 2 |   |   |   |   |   | 2 |   |   | 1 |   |   | 6 |   |   |
| C | 0 | 2 |   |   |   |   |   |   | 1 |   | ON |   |   |   |   |   |   | 2 |   |   | 3 |   |   | 2 |   |   | 1 |   | ON |
| D |   |   |   |   |   |   |   |   |   |   |   |   |   |   |   |   |   |   |   |   |   |   |   |   |   |   |   |   |   |
| E | 0 | 3 | 2 |   | ON |   |   |   |   |   |   |   |   |   | 1 |   | ON |   |   |   | 4 |   |   | 3 |   | ON | 2 |   |   |
| F | 0 | 2 |   |   |   | 2 |   | ON |   |   |   |   |   |   |   |   |   | 1 |   | ON | 5 |   |   | 4 |   |   | 3 |   |   |
| G | 0 | 2 |   |   |   |   |   |   | 2 |   |   |   |   |   |   |   |   |   |   |   | 1 |   | ON | 6 |   | ON | 5 |   |   |
| H |   |   |   |   |   |   |   |   |   |   |   |   |   |   |   |   |   |   |   |   |   |   |   |   |   |   |   |   |   |
| TNOP |   |   | 2 |   |   | 2 |   |   | 2 |   |   | 2 |   |   | 2 |   |   | 2 |   |   | 6 |   |   | 6 |   |   | 6 |   |   |

FIG.20B

| PORT | PORT STATUS | NOIH | H(1) PRIORITY | H(1) PORT FLAG | H(1) PATH FLAG | H(2) PRIORITY | H(2) PORT FLAG | H(2) PATH FLAG | H(3) PRIORITY | H(3) PORT FLAG | H(3) PATH FLAG | H(4) PRIORITY | H(4) PORT FLAG | H(4) PATH FLAG | H(5) PRIORITY | H(5) PORT FLAG | H(5) PATH FLAG | H(6) PRIORITY | H(6) PORT FLAG | H(6) PATH FLAG | H(7) PRIORITY | H(7) PORT FLAG | H(7) PATH FLAG | H(8) PRIORITY | H(8) PORT FLAG | H(8) PATH FLAG | H(9) PRIORITY | H(9) PORT FLAG | H(9) PATH FLAG |
|---|---|---|---|---|---|---|---|---|---|---|---|---|---|---|---|---|---|---|---|---|---|---|---|---|---|---|---|---|---|
| A | 2 |   | 1 |   |   |   |   |   |   |   |   | 2 |   |   |   |   |   |   |   |   | 1 |   |   | 6 |   |   | 5 |   |   |
| B | 2 |   |   |   |   | 1 |   |   |   |   |   |   |   |   | 2 |   |   |   |   |   | 2 |   |   | 1 |   |   | 6 |   |   |
| C | 2 | 2 |   |   |   |   |   |   | 1 |   | ON |   |   |   |   |   |   | 2 |   |   | 3 |   |   | 2 |   |   | 1 |   | ON |
| D | 2 |   |   |   |   |   |   |   |   |   |   |   |   |   |   |   |   |   |   |   |   |   |   |   |   |   |   |   |   |
| E | 0 | 3 | 2 |   | ON |   |   |   |   |   |   |   |   |   | 1 |   | ON |   |   |   | 4 |   |   | 3 |   | ON | 2 |   |   |
| F | 0 | 2 |   |   |   | 2 |   | ON |   |   |   |   |   |   |   |   |   | 1 |   | ON | 5 |   |   | 4 |   |   | 3 |   |   |
| G | 0 | 2 |   |   |   |   |   |   | 2 |   |   |   |   |   |   |   |   |   |   |   | 1 |   | ON | 6 |   | ON | 5 |   |   |
| H |   |   |   |   |   |   |   |   |   |   |   |   |   |   |   |   |   |   |   |   |   |   |   |   |   |   |   |   |   |
| TNOP |   |   | 2 |   |   | 2 |   |   | 2 |   |   | 2 |   |   | 2 |   |   | 2 |   |   | 6 |   |   | 6 |   |   | 6 |   |   |

| PORT | PORT STATUS | HION | H(1) PRIORITY | H(1) PORT FLAG | H(1) PATH FLAG | H(2) PRIORITY | H(2) PORT FLAG | H(2) PATH FLAG | H(3) PRIORITY | H(3) PORT FLAG | H(3) PATH FLAG | H(4) PRIORITY | H(4) PORT FLAG | H(4) PATH FLAG | H(5) PRIORITY | H(5) PORT FLAG | H(5) PATH FLAG | H(6) PRIORITY | H(6) PORT FLAG | H(6) PATH FLAG | H(7) PRIORITY | H(7) PORT FLAG | H(7) PATH FLAG | H(8) PRIORITY | H(8) PORT FLAG | H(8) PATH FLAG | H(9) PRIORITY | H(9) PORT FLAG | H(9) PATH FLAG |
|---|---|---|---|---|---|---|---|---|---|---|---|---|---|---|---|---|---|---|---|---|---|---|---|---|---|---|---|---|---|
| A | 2 | | 1 | | | | | | | | | 2 | | | | | | | | | 1 | | | 6 | | | 5 | | |
| B | 2 | | | | | 1 | | | | | | | | | 2 | | | | | | 2 | | | 1 | | | 6 | | |
| C | 2 | 2 | | | | | | | 1 | | | | | | | | | 2 | | | 3 | | | 2 | | | 1 | ON | |
| D | 2 | | | | | | | | | | | | | | | | | | | | | | | | | | | | |
| E | 0 | 3 | 2 | ON | | | | | | | | 1 | ON | | | | | | | | 4 | | | 3 | ON | | 2 | | |
| F | 0 | 2 | | | | 2 | ON | | | | | | | | 1 | ON | | | | | 5 | | | 4 | | | 3 | | |
| G | 0 | 2 | | | | | | | 2 | ON | | | | | | | | 1 | ON | | 6 | ON | | 5 | | | 4 | | |
| H | | | | | | | | | | | | | | | | | | | | | | | | | | | | | |
| TNOP | | | 2 | | | 2 | | | 2 | | | 2 | | | 2 | | | 2 | | | 6 | | | 6 | | | 6 | | |

| PORT | PORT STATUS | HION | H(1) PRIORITY | H(1) PORT FLAG | H(1) PATH FLAG | H(2) PRIORITY | H(2) PORT FLAG | H(2) PATH FLAG | H(3) PRIORITY | H(3) PORT FLAG | H(3) PATH FLAG | H(4) PRIORITY | H(4) PORT FLAG | H(4) PATH FLAG | H(5) PRIORITY | H(5) PORT FLAG | H(5) PATH FLAG | H(6) PRIORITY | H(6) PORT FLAG | H(6) PATH FLAG | H(7) PRIORITY | H(7) PORT FLAG | H(7) PATH FLAG | H(8) PRIORITY | H(8) PORT FLAG | H(8) PATH FLAG | H(9) PRIORITY | H(9) PORT FLAG | H(9) PATH FLAG |
|---|---|---|---|---|---|---|---|---|---|---|---|---|---|---|---|---|---|---|---|---|---|---|---|---|---|---|---|---|---|
| A | 2 | | 1 | | | | | | | | | 2 | | | | | | | | | 1 | | | 6 | | | 5 | | |
| B | 2 | | | | | 1 | | | | | | | | | 2 | | | | | | 2 | | | 1 | | | 6 | | |
| C | 2 | *1* | | | | | | | 1 | | | | | | | | | 2 | | | 3 | | | 2 | | | 1 | ON | |
| D | 2 | | | | | | | | | | | | | | | | | | | | | | | | | | | | |
| E | 0 | 3 | 2 | ON | | | | | | | | 1 | ON | | | | | | | | 4 | | | 3 | ON | | 2 | | |
| F | 0 | 2 | | | | 2 | ON | | | | | | | | 1 | ON | | | | | 5 | | | 4 | | | 3 | | |
| G | 0 | *3* | | | | | | | 2 | ON | | | | | | | | 1 | ON | | 6 | ON | | 5 | | | 4 | | |
| H | | | | | | | | | | | | | | | | | | | | | | | | | | | | | |
| TNOP | | | 2 | | | 2 | | | 2 | | | 2 | | | 2 | | | 2 | | | 6 | | | 6 | | | 6 | | |

FIG.22A

| PORT | PORT STATUS | NOIH | H(1) PRIORITY | H(1) PORT FLAG | H(2) PRIORITY | H(2) PORT FLAG | H(3) PRIORITY | H(3) PORT FLAG | H(4) PRIORITY | H(4) PORT FLAG | H(5) PRIORITY | H(5) PORT FLAG | H(6) PRIORITY | H(6) PORT FLAG | H(7) PRIORITY | H(7) PORT FLAG | H(8) PRIORITY | H(8) PORT FLAG | H(9) PRIORITY | H(9) PORT FLAG | PATH FLAG |
|---|---|---|---|---|---|---|---|---|---|---|---|---|---|---|---|---|---|---|---|---|---|
| A | 2 |   | 1 |   |   |   |   |   | 2 |   |   |   |   |   | 1 |   | 6 |   | 5 |   |   |
| B | 2 |   |   |   | 1 |   |   |   |   |   | 2 |   |   |   | 2 |   | 1 |   | 6 |   |   |
| C | 2 | 1 |   |   |   |   | 1 |   |   |   |   |   | 2 |   | 3 |   | 2 |   | 1 |   |   |
| D | 2 |   |   |   |   |   |   |   |   |   |   |   |   |   |   |   |   |   |   |   |   |
| E | 0 | 3 | 2 | ON |   |   |   |   | 1 | ON |   |   |   |   | 4 |   | 3 | ON | 2 |   |   |
| F | 0 | 2 |   |   | 2 | ON |   |   |   |   | 1 | ON |   |   | 5 |   | 4 |   | 3 |   | ON |
| G | 0 | 3 |   |   |   |   | 2 | ON |   |   |   |   | 1 | ON | 6 | ON | 5 |   | 4 |   |   |
| H |   |   |   |   |   |   |   |   |   |   |   |   |   |   |   |   |   |   |   |   |   |
| TNOP |   |   | 2 |   | 2 |   | 2 |   | 2 |   | 2 |   | 2 |   | 6 |   | 6 |   | 6 |   |   |

FIG.22B

| PORT | PORT STATUS | NOIH | H(1) PRIORITY | H(1) PORT FLAG | H(2) PRIORITY | H(2) PORT FLAG | H(3) PRIORITY | H(3) PORT FLAG | H(4) PRIORITY | H(4) PORT FLAG | H(5) PRIORITY | H(5) PORT FLAG | H(6) PRIORITY | H(6) PORT FLAG | H(7) PRIORITY | H(7) PORT FLAG | H(8) PRIORITY | H(8) PORT FLAG | H(9) PRIORITY | H(9) PORT FLAG | PATH FLAG |
|---|---|---|---|---|---|---|---|---|---|---|---|---|---|---|---|---|---|---|---|---|---|
| A | 2 |   | 1 |   |   |   |   |   | 2 |   |   |   |   |   | 1 |   | 6 |   | 5 |   |   |
| B | 2 |   |   |   | 1 |   |   |   |   |   | 2 |   |   |   | 2 |   | 1 |   | 6 |   |   |
| C | 2 |   |   |   |   |   | 1 |   |   |   |   |   | 2 |   | 3 |   | 2 |   | 1 |   |   |
| D | 2 |   |   |   |   |   |   |   |   |   |   |   |   |   |   |   |   |   |   |   |   |
| E | 0 | 3 | 2 | ON |   |   |   |   | 1 | ON |   |   |   |   | 4 |   | 3 | ON | 2 |   |   |
| F | 0 | 3 |   |   | 2 | ON |   |   |   |   | 1 | ON |   |   | 5 |   | 4 |   | 3 |   | ON |
| G | 0 | 3 |   |   |   |   | 2 | ON |   |   |   |   | 1 | ON | 6 | ON | 5 |   | 4 |   |   |
| H |   |   |   |   |   |   |   |   |   |   |   |   |   |   |   |   |   |   |   |   |   |
| TNOP |   |   | 2 |   | 2 |   | 2 |   | 2 |   | 2 |   | 2 |   | 6 |   | 6 |   | 6 |   |   |

FIG.23A 1251

| PORT | PORT STATUS | NOIH | H(1) PRIORITY | H(1) PORT FLAG | H(1) PATH FLAG | H(2) PRIORITY | H(2) PORT FLAG | H(2) PATH FLAG | H(3) PRIORITY | H(3) PORT FLAG | H(3) PATH FLAG | H(4) PRIORITY | H(4) PORT FLAG | H(4) PATH FLAG | H(5) PRIORITY | H(5) PORT FLAG | H(5) PATH FLAG | H(6) PRIORITY | H(6) PORT FLAG | H(6) PATH FLAG | H(7) PRIORITY | H(7) PORT FLAG | H(7) PATH FLAG | H(8) PRIORITY | H(8) PORT FLAG | H(8) PATH FLAG | H(9) PRIORITY | H(9) PORT FLAG | H(9) PATH FLAG |
|---|---|---|---|---|---|---|---|---|---|---|---|---|---|---|---|---|---|---|---|---|---|---|---|---|---|---|---|---|---|
| A | 0 |   | 1 |   |   |   |   |   |   |   |   | 2 |   |   |   |   |   |   |   |   | 1 |   |   | 6 |   |   | 5 |   |   |
| B | 0 |   |   |   |   | 1 |   |   |   |   |   |   |   |   | 2 |   |   |   |   |   | 2 |   |   | 1 |   |   | 6 |   |   |
| C | 0 |   |   |   |   |   |   |   | 1 |   |   |   |   |   |   |   |   | 2 |   |   | 3 |   |   | 2 |   |   | 1 |   |   |
| D | 0 |   |   |   |   |   |   |   |   |   |   |   |   |   |   |   |   |   |   |   |   |   |   |   |   |   |   |   |   |
| E | 0 | 3 | 2 | ON |   |   |   |   |   |   |   | 1 | ON |   |   |   |   |   |   |   | 4 |   |   | 3 | ON |   | 2 |   |   |
| F | 0 | 3 |   |   |   | 2 | ON |   |   |   |   |   |   |   | 1 | ON |   |   |   |   | 5 |   |   | 4 |   |   | 3 | ON |   |
| G | 0 | 3 |   |   |   |   |   |   | 2 | ON |   |   |   |   |   |   |   | 1 | ON |   | 6 | ON |   | 5 |   |   | 4 |   |   |
| H |   |   |   |   |   |   |   |   |   |   |   |   |   |   |   |   |   |   |   |   |   |   |   |   |   |   |   |   |   |
| TNOP |   |   | 2 |   |   | 2 |   |   | 2 |   |   | 2 |   |   | 2 |   |   | 2 |   |   | 6 |   |   | 6 |   |   | 6 |   |   |

FIG.23B 1251

| PORT | PORT STATUS | NOIH | H(1) PRIORITY | H(1) PORT FLAG | H(1) PATH FLAG | H(2) PRIORITY | H(2) PORT FLAG | H(2) PATH FLAG | H(3) PRIORITY | H(3) PORT FLAG | H(3) PATH FLAG | H(4) PRIORITY | H(4) PORT FLAG | H(4) PATH FLAG | H(5) PRIORITY | H(5) PORT FLAG | H(5) PATH FLAG | H(6) PRIORITY | H(6) PORT FLAG | H(6) PATH FLAG | H(7) PRIORITY | H(7) PORT FLAG | H(7) PATH FLAG | H(8) PRIORITY | H(8) PORT FLAG | H(8) PATH FLAG | H(9) PRIORITY | H(9) PORT FLAG | H(9) PATH FLAG |
|---|---|---|---|---|---|---|---|---|---|---|---|---|---|---|---|---|---|---|---|---|---|---|---|---|---|---|---|---|---|
| A | 0 |   | 1 | ON |   |   |   |   |   |   |   | 2 |   |   |   |   |   |   |   |   | 1 |   |   | 6 |   |   | 5 |   |   |
| B | 0 |   |   |   |   |   |   |   |   |   |   |   |   |   | 2 |   |   |   |   |   | 2 |   |   | 1 |   |   | 6 |   |   |
| C | 0 |   |   |   |   |   |   |   | 1 |   |   |   |   |   |   |   |   | 2 |   |   | 3 |   |   | 2 |   |   | 1 |   |   |
| D | 0 |   |   |   |   |   |   |   |   |   |   |   |   |   |   |   |   |   |   |   |   |   |   |   |   |   |   |   |   |
| E | 0 | 3 | 2 |   |   |   |   |   |   |   |   | 1 | ON |   |   |   |   |   |   |   | 4 |   |   | 3 | ON |   | 2 |   |   |
| F | 0 | 3 |   |   |   | 2 | ON |   |   |   |   |   |   |   | 1 | ON |   |   |   |   | 5 |   |   | 4 |   |   | 3 | ON |   |
| G | 0 | 3 |   |   |   |   |   |   | 2 | ON |   |   |   |   |   |   |   | 1 | ON |   | 6 | ON |   | 5 |   |   | 4 |   |   |
| H |   |   |   |   |   |   |   |   |   |   |   |   |   |   |   |   |   |   |   |   |   |   |   |   |   |   |   |   |   |
| TNOP |   |   | 2 |   |   | 2 |   |   | 2 |   |   | 2 |   |   | 2 |   |   | 2 |   |   | 6 |   |   | 6 |   |   | 6 |   |   |

FIG. 24A

| PORT | PORT STATUS | NOIH | H(1) PRI / PF / PaF | H(2) PRI / PF / PaF | H(3) PRI / PF / PaF | H(4) PRI / PF / PaF | H(5) PRI / PF / PaF | H(6) PRI / PF / PaF | H(7) PRI / PF / PaF | H(8) PRI / PF / PaF | H(9) PRI / PF / PaF |
|---|---|---|---|---|---|---|---|---|---|---|---|
| A | 0 | 1 | 1 / ON / | | | 2 / / | | 1 / / | 6 / / | 5 / / | |
| B | 0 | | | 1 / / | | 2 / / | | 2 / / | 1 / / | 6 / / | |
| C | 0 | | | | 1 / / | | | 2 / / | 3 / / | 2 / / | 1 / / |
| D | 0 | | | | | | | | | | |
| E | 0 | 2 | 2 / / | | | 1 / / ON | | | 4 / / | 3 / / ON | 2 / / |
| F | 0 | 3 | | 2 / ON / | | | | 1 / / ON | 5 / / | 4 / / | 3 / / ON |
| G | 0 | 3 | | | 2 / / ON | | | 1 / ON / | 6 / ON / | 5 / / | 4 / / |
| H | | | | | | | | | | | |
| TNOP | | | 2 | 2 | 2 | 2 | 2 | 6 | 6 | 6 | |

| PORT | PORT STATUS | NOIH | H(1) PRI / PF / PaF | H(2) PRI / PF / PaF | H(3) PRI / PF / PaF | H(4) PRI / PF / PaF | H(5) PRI / PF / PaF | H(6) PRI / PF / PaF | H(7) PRI / PF / PaF | H(8) PRI / PF / PaF | H(9) PRI / PF / PaF |
|---|---|---|---|---|---|---|---|---|---|---|---|
| A | 0 | 1 | 1 / ON / | | | 2 / / | | 1 / / | 6 / / | 5 / / | |
| B | 0 | | | 1 / / | / / ON | 2 / / | | 2 / / | 1 / / | 6 / / | |
| C | 0 | | | | 1 / / | | | 2 / / | 3 / / | 2 / / | 1 / / |
| D | 0 | | | | | | | | | | |
| E | 0 | 2 | 2 / / | | | 1 / / ON | | | 4 / / | 3 / / ON | 2 / / |
| F | 0 | 3 | | 2 / / | | | | 1 / / ON | 5 / / | 4 / / | 3 / / ON |
| G | 0 | 3 | | | 2 / / ON | | | 1 / ON / | 6 / ON / | 5 / / | 4 / / |
| H | | | | | | | | | | | |
| TNOP | | | 2 | 2 | 2 | 2 | 2 | 6 | 6 | 6 | |

| PORT | PORT STATUS | NOIH | H(1) PRIORITY | H(1) PATH FLAG | H(2) PRIORITY | H(2) PATH FLAG | H(3) PRIORITY | H(3) PATH FLAG | H(4) PRIORITY | H(4) PATH FLAG | H(5) PRIORITY | H(5) PATH FLAG | H(6) PRIORITY | H(6) PATH FLAG | H(7) PRIORITY | H(7) PATH FLAG | H(8) PRIORITY | H(8) PATH FLAG | H(9) PRIORITY | H(9) PATH FLAG |
|---|---|---|---|---|---|---|---|---|---|---|---|---|---|---|---|---|---|---|---|---|
| A | 0 | 1 | 1 | ON | | | | | 2 | | | | | | 1 | | 6 | | 5 | |
| B | 0 | 1 | | | 1 | ON | | | | | 2 | | | | 2 | | 1 | | 6 | |
| C | 0 | | | | | | 1 | | | | | | 2 | | 3 | | 2 | | 1 | |
| D | 0 | | | | | | | | | | | | | | | | | | | |
| E | 0 | 2 | 2 | | | | | | 1 | ON | | | | | 4 | | 3 | ON | 2 | |
| F | 0 | 2 | | | 2 | | | | | | 1 | ON | | | 5 | | 4 | | 3 | ON |
| G | 0 | 3 | | | | | 2 | ON | | | | | 1 | ON | 6 | ON | 5 | | 4 | |
| H | | | | | | | | | | | | | | | | | | | | |
| TNOP | | | 2 | | 2 | | 2 | | 2 | | 2 | | 2 | | 6 | | 6 | | 6 | |

| PORT | PORT STATUS | NOIH | H(1) PRIORITY | H(1) PATH FLAG | H(2) PRIORITY | H(2) PATH FLAG | H(3) PRIORITY | H(3) PATH FLAG | H(4) PRIORITY | H(4) PATH FLAG | H(5) PRIORITY | H(5) PATH FLAG | H(6) PRIORITY | H(6) PATH FLAG | H(7) PRIORITY | H(7) PATH FLAG | H(8) PRIORITY | H(8) PATH FLAG | H(9) PRIORITY | H(9) PATH FLAG |
|---|---|---|---|---|---|---|---|---|---|---|---|---|---|---|---|---|---|---|---|---|
| A | 0 | 1 | 1 | ON | | | | | 2 | | | | | | 1 | | 6 | | 5 | |
| B | 0 | 1 | | | 1 | ON | | | | | 2 | | | | 2 | | 1 | | 6 | |
| C | 0 | | | | | | 1 | ON | | | | | 2 | | 3 | | 2 | | 1 | |
| D | 0 | | | | | | | | | | | | | | | | | | | |
| E | 0 | 2 | 2 | | | | | | | ON | | | | | 4 | | 3 | ON | 2 | |
| F | 0 | 2 | | | 2 | | | | | | 1 | ON | | | 5 | | 4 | | 3 | ON |
| G | 0 | 3 | | | | | 2 | | | | | | 1 | ON | 6 | ON | 5 | | 4 | |
| H | | | | | | | | | | | | | | | | | | | | |
| TNOP | | | 2 | | 2 | | 2 | | 2 | | 2 | | 2 | | 6 | | 6 | | 6 | |

FIG.26

| PORT | PORT STATUS | NOIH | H(1) PRIORITY | H(1) PORT FLAG | H(1) PATH FLAG | H(2) PRIORITY | H(2) PORT FLAG | H(2) PATH FLAG | H(3) PRIORITY | H(3) PORT FLAG | H(3) PATH FLAG | H(4) PRIORITY | H(4) PORT FLAG | H(4) PATH FLAG | H(5) PRIORITY | H(5) PORT FLAG | H(5) PATH FLAG | H(6) PRIORITY | H(6) PORT FLAG | H(6) PATH FLAG | H(7) PRIORITY | H(7) PORT FLAG | H(7) PATH FLAG | H(8) PRIORITY | H(8) PORT FLAG | H(8) PATH FLAG | H(9) PRIORITY | H(9) PORT FLAG | H(9) PATH FLAG |
|---|---|---|---|---|---|---|---|---|---|---|---|---|---|---|---|---|---|---|---|---|---|---|---|---|---|---|---|---|---|
| A | 0 | 1 | 1 | ON | | | | | | | | 2 | | | | | | | | | 1 | | | 6 | | | 5 | | |
| B | 0 | 1 | | | | 1 | ON | | | | | | | | 2 | | | | | | 2 | | | 1 | | | 6 | | |
| C | 0 | *1* | | | | | | | 1 | ON | | | | | | | | | | | 2 | | | 3 | | | 2 | | | 1 | | |
| D | 0 | | | | | | | | | | | | | | | | | | | | | | | | | | | | |
| E | 0 | 2 | 2 | | | | | | | | | | | | 1 | ON | | | | | 4 | | | 3 | ON | | 2 | | |
| F | 0 | 2 | | | | 2 | | | | | | | | | | | | 1 | ON | | 5 | | | 4 | | | 3 | ON | |
| G | 0 | *2* | | | | | | | 2 | | | | | | | | | | | | 1 | ON | 6 | ON | | 5 | | | 4 | | |
| H | | | | | | | | | | | | | | | | | | | | | | | | | | | | | |
| TNOP | | | 2 | | | 2 | | | 2 | | | 2 | | | 2 | | | 2 | | | 6 | | | 6 | | | 6 | | |

| PORT | PORT STATUS | NOIH | H(1) PRIORITY | H(1) PORT FLAG | H(2) PRIORITY | H(2) PORT FLAG | H(3) PRIORITY | H(3) PORT FLAG | H(4) PRIORITY | H(4) PORT FLAG | H(5) PRIORITY | H(5) PORT FLAG | H(6) PRIORITY | H(6) PORT FLAG | H(7) PRIORITY | H(7) PORT FLAG | H(8) PRIORITY | H(8) PORT FLAG | H(9) PRIORITY | H(9) PORT FLAG | PATH FLAG |
|---|---|---|---|---|---|---|---|---|---|---|---|---|---|---|---|---|---|---|---|---|---|
| A | 0 | 3 | 1 | ON |  |  |  |  | 2 |  |  |  |  |  | 1 | ON | 6 |  | 5 |  |  |
| B | 0 | 2 |  |  | 1 | ON |  |  |  |  | 2 |  |  |  | 2 |  | 1 | ON | 6 |  |  |
| C | 0 | 2 |  |  |  |  | 1 | ON |  |  |  |  | 2 |  | 3 |  | 2 |  | 1 | ON |  |
| D |  |  |  |  |  |  |  |  |  |  |  |  |  |  |  |  |  |  |  |  |  |
| E | 0 | 0 | 2 |  |  |  |  |  |  |  | 1 | ON |  |  | 4 |  | 3 |  | 2 |  |  |
| F | 0 | 1 |  |  | 2 |  |  |  |  |  |  |  | 1 | ON | 5 |  | 4 |  | 3 |  |  |
| G | 0 | 1 |  |  |  |  | 2 |  |  |  |  |  |  |  | 1 | ON | 6 |  | 5 | 4 |  |
| H |  |  |  |  |  |  |  |  |  |  |  |  |  |  |  |  |  |  |  |  |  |
| TNOP |  |  | 2 |  | 2 |  | 2 |  | 2 |  | 2 |  | 2 |  | 6 |  | 6 |  | 6 |  |  |

FIG. 28B

| PORT | PORT STATUS | NOIH | H(1) PRIORITY | H(1) PORT FLAG | H(2) PRIORITY | H(2) PORT FLAG | H(3) PRIORITY | H(3) PORT FLAG | H(4) PRIORITY | H(4) PORT FLAG | H(5) PRIORITY | H(5) PORT FLAG | H(6) PRIORITY | H(6) PORT FLAG | H(7) PRIORITY | H(7) PORT FLAG | H(8) PRIORITY | H(8) PORT FLAG | H(9) PRIORITY | H(9) PORT FLAG | PATH FLAG |
|---|---|---|---|---|---|---|---|---|---|---|---|---|---|---|---|---|---|---|---|---|---|
| A | 0 | 3 | 1 | ON |  |  |  |  | 2 |  |  |  |  |  | 1 | ON | 6 |  | 5 |  |  |
| B | 0 | 2 |  |  | 1 | ON |  |  |  |  | 2 |  |  |  | 2 |  | 1 | ON | 6 |  |  |
| C | 0 | 2 |  |  |  |  | 1 | ON |  |  |  |  | 2 |  | 3 |  | 2 |  | 1 | ON |  |
| D |  |  |  |  |  |  |  |  |  |  |  |  |  |  |  |  |  |  |  |  |  |
| E | 0 | 0 | 2 |  |  |  |  |  |  |  | 1 |  |  |  | 4 |  | 3 |  | 2 |  |  |
| F | 0 | 1 |  |  | 2 |  |  |  |  |  |  |  | 1 | ON | 5 |  | 4 |  | 3 |  |  |
| G | 0 | 1 |  |  |  |  | 2 |  |  |  |  |  |  |  | 1 | ON | 6 |  | 5 | 4 |  |
| H |  |  |  |  |  |  |  |  |  |  |  |  |  |  |  |  |  |  |  |  |  |
| TNOP |  |  | 2 |  | 2 |  | 2 |  | 2 |  | 2 |  | 2 |  | 6 |  | 6 |  | 6 |  |  |

FIG. 29A (1251)

| PORT | PORT STATUS | NOIH | H(1) PRIORITY | H(1) PORT FLAG | H(1) PATH FLAG | H(2) PRIORITY | H(2) PORT FLAG | H(2) PATH FLAG | H(3) PRIORITY | H(3) PORT FLAG | H(3) PATH FLAG | H(4) PRIORITY | H(4) PORT FLAG | H(4) PATH FLAG | H(5) PRIORITY | H(5) PORT FLAG | H(5) PATH FLAG | H(6) PRIORITY | H(6) PORT FLAG | H(6) PATH FLAG | H(7) PRIORITY | H(7) PORT FLAG | H(7) PATH FLAG | H(8) PRIORITY | H(8) PORT FLAG | H(8) PATH FLAG | H(9) PRIORITY | H(9) PORT FLAG | H(9) PATH FLAG |
|---|---|---|---|---|---|---|---|---|---|---|---|---|---|---|---|---|---|---|---|---|---|---|---|---|---|---|---|---|---|
| A | 0 | 3 | 1 | ON | | | | | | | | 2 | | | | | | | | | 1 | | | 6 | | | 5 | | |
| B | 0 | 2 | | | | 1 | ON | | | | | | | | 2 | | | | | | 2 | | | 1 | ON | | 6 | | |
| C | 0 | 2 | | | | | | | 1 | ON | | | | | | | | 2 | | | 3 | | | 2 | | | 1 | ON | |
| D | | | | | | | | | | | | | | | | | | | | | | | | | | | | | |
| E | 0 | 0 | 2 | | | | | | | | | 1 | ON | | | | | | | | 4 | | | 3 | | | 2 | | |
| F | 0 | 1 | | | | 2 | | | | | | | | | 1 | ON | | | | | 5 | | | 4 | | | 3 | | |
| G | 0 | 1 | | | | | | | 2 | | | | | | | | | 1 | ON | | 6 | | | 5 | | | 4 | | |
| H | | | | | | | | | | | | | | | | | | | | | | | | | | | | | |
| TNOP | | | 2 | | | 2 | | | 2 | | | 2 | | | 2 | | | 2 | | | 6 | | | 6 | | | 6 | | |

FIG. 29B (1251)

| PORT | PORT STATUS | NOIH | H(1) PRIORITY | H(1) PORT FLAG | H(1) PATH FLAG | H(2) PRIORITY | H(2) PORT FLAG | H(2) PATH FLAG | H(3) PRIORITY | H(3) PORT FLAG | H(3) PATH FLAG | H(4) PRIORITY | H(4) PORT FLAG | H(4) PATH FLAG | H(5) PRIORITY | H(5) PORT FLAG | H(5) PATH FLAG | H(6) PRIORITY | H(6) PORT FLAG | H(6) PATH FLAG | H(7) PRIORITY | H(7) PORT FLAG | H(7) PATH FLAG | H(8) PRIORITY | H(8) PORT FLAG | H(8) PATH FLAG | H(9) PRIORITY | H(9) PORT FLAG | H(9) PATH FLAG |
|---|---|---|---|---|---|---|---|---|---|---|---|---|---|---|---|---|---|---|---|---|---|---|---|---|---|---|---|---|---|
| A | 0 | 2 | 1 | ON | | | | | | | | 2 | | | | | | | | | 1 | | | 6 | | | 5 | | |
| B | 0 | 2 | | | | 1 | ON | | | | | | | | 2 | | | | | | 2 | | | 1 | ON | | 6 | | |
| C | 0 | 2 | | | | | | | 1 | ON | | | | | | | | 2 | | | 3 | | | 2 | | | 1 | ON | |
| D | | | | | | | | | | | | | | | | | | | | | | | | | | | | | |
| E | 0 | 1 | 2 | | | | | | | | | 1 | ON | | | | | | | | 4 | | | 3 | | | 2 | | |
| F | 0 | 1 | | | | 2 | | | | | | | | | 1 | ON | | | | | 5 | | | 4 | | | 3 | | |
| G | 0 | 1 | | | | | | | 2 | | | | | | | | | 1 | ON | | 6 | | | 5 | | | 4 | | |
| H | | | | | | | | | | | | | | | | | | | | | | | | | | | | | |
| TNOP | | | 2 | | | 2 | | | 2 | | | 2 | | | 2 | | | 2 | | | 6 | | | 6 | | | 6 | | |

| PORT | PORT STATUS | NOIH | H(1) | | H(2) | | H(3) | | H(4) | | H(5) | | H(6) | | H(7) | | H(8) | | H(9) | |
|---|---|---|---|---|---|---|---|---|---|---|---|---|---|---|---|---|---|---|---|---|
| | | | PRIORITY | PATH FLAG | PRIORITY | PATH FLAG | PRIORITY | PATH FLAG | PRIORITY | PATH FLAG | PRIORITY | PATH FLAG | PRIORITY | PATH FLAG | PRIORITY | PATH FLAG | PRIORITY | PATH FLAG | PRIORITY | PATH FLAG |
| A | 0 | 1 | 1 | ON | | | | | 2 | | | | | | 1 | | 6 | | 5 | |
| B | 0 | 2 | | | 1 | ON | | | | | 2 | | | | 2 | | 1 | ON | 6 | |
| C | 0 | 2 | | | | | 1 | ON | | | | | 2 | | 3 | | 2 | | 1 | ON |
| D | | | | | | | | | | | | | | | | | | | | |
| E | 0 | 2 | 2 | ON | | | | | 1 | ON | | | | | 4 | | 3 | | 2 | |
| F | 0 | 1 | | | 2 | | | | | | 1 | ON | | | 5 | | 4 | | 3 | |
| G | 0 | 1 | | | | | 2 | | | | | | 1 | ON | 6 | | 5 | | 4 | |
| H | | | | | | | | | | | | | | | | | | | | |
| TNOP | | | 2 | | 2 | | 2 | | 2 | | 2 | | 2 | | 6 | | 6 | | 6 | |

| PORT | PORT STATUS | NOIH | H(1) | | H(2) | | H(3) | | H(4) | | H(5) | | H(6) | | H(7) | | H(8) | | H(9) | |
|---|---|---|---|---|---|---|---|---|---|---|---|---|---|---|---|---|---|---|---|---|
| | | | PRIORITY | PATH FLAG | PRIORITY | PATH FLAG | PRIORITY | PATH FLAG | PRIORITY | PATH FLAG | PRIORITY | PATH FLAG | PRIORITY | PATH FLAG | PRIORITY | PATH FLAG | PRIORITY | PATH FLAG | PRIORITY | PATH FLAG |
| A | 0 | 1 | 1 | | | | | | 2 | | | | | | 1 | ON | 6 | | 5 | |
| B | 0 | 2 | | | 1 | ON | | | | | 2 | | | | 2 | | 1 | ON | 6 | |
| C | 0 | 2 | | | | | 1 | ON | | | | | 2 | | 3 | | 2 | | 1 | ON |
| D | | | | | | | | | | | | | | | | | | | | |
| E | 0 | 2 | 2 | ON | | | | | 1 | ON | | | | | 4 | | 3 | | 2 | |
| F | 0 | 1 | | | 2 | | | | | | 1 | ON | | | 5 | | 4 | | 3 | |
| G | 0 | 1 | | | | | 2 | | | | | | 1 | ON | 6 | | 5 | | 4 | |
| H | | | | | | | | | | | | | | | | | | | | |
| TNOP | | | 2 | | 2 | | 2 | | 2 | | 2 | | 2 | | 6 | | 6 | | 6 | |

PATH CHANGEOVER SUPPORT DEVICE AND METHOD

TECHNICAL FIELD

The present invention generally relates to changing over a path which is a path between a storage system and an external device.

BACKGROUND ART

For example, in Patent Document #1, a method of path changeover control is disclosed in which, according to the states of load of paths between a host device and a storage system, a path which is used by the host device is dynamically changed over.

Patent Citation 1

Japanese Laid-Open Patent Publication 2007-287064.

DISCLOSURE OF INVENTION

Technical Problem

A plurality of paths extend between a host device and a storage system. This plurality of paths includes a path which is used as an I/O path, and one or more paths which are used as alternate paths. The path which is used as an I/O path is the path which is used when the host device issues an I/O command. And a path which is used as alternate paths is a path which can be used as an I/O path.

Generally if, due to a port fault or the like, an anomaly occurs in the path which is being used as the I/O path (for example if a fault occurs), then the host device can detect the anomaly. This is because an error is detected, such as it not being possible to issue an I/O command or the like.

However, if a path which is used as an alternate path becomes anomalous, then generally the host device is not able to detect this anomalous state. The reason for this is that no I/O commands are being issued upon this path which is used as an alternate path.

Due to this, when path changeover is performed by using, for the I/O path, a path which is being used as an alternate path, sometimes it happens that an anomalous path is selected as the path to which changeover of the I/O path is performed. In this case, if an I/O command is issued by using the path after path changeover, a I/O failure occurs.

This type of problem can also occur if the device external to the storage system is some type of device other than a host device (for example, another storage system).

Thus, the object of the present invention is, when an external device performs path changeover, to ensure that an anomalous path is not selected as the path to which changeover of the I/O path is performed.

Technical Solution

The path changeover support device according to the present invention includes a storage resource, a status detection unit, a port selection unit, and a port notification unit. The storage resource stores port management information including information related to a status for each of a plurality of ports possessed by the storage system. The status detection unit detects change from "normal" to anomalous of the status of any one of the plurality of ports. For a subject external device, being an external device which is using as an I/O path the anomalous path (which is the path related to the anomaly), on the basis of the port management information, a port selection unit selects a "normal" port, which is a port whose status is "normal", from among one or more ports related to one or more paths which are being used as alternate paths. And a port notification unit takes information related to a port related to the path which is taken as an I/O path instead of the anomalous path, and notifies to the subject external device information related to the "normal" port which has been selected. Thus, during the path changeover, the subject external device selects as an I/O path an alternate path which is related to the "normal" port specified from the information which has been notified.

The path changeover support device may, for example, be included in a storage system (for example, it may be a controller which is included in a storage system), and may also be a device (for example a management computer) which can communicated with the storage system and the external device. At least one of the status detection unit, the port selection unit, and the port notification unit may be constructed as hardware, a computer program, or a combination thereof (for example one portion thereof may be implemented as a computer program while the remainder is implemented in hardware).

BRIEF DESCRIPTION OF DRAWINGS

FIG. 4 shows the structure of a port information table 1251.

FIG. 5 shows the flow of processing which is performed when a host has detected that some fault has occurred in a path.

FIG. 6A shows an example of the port information table 1251 before the processing shown in FIG. 5 starts.

FIG. 6B shows an example of the port information table 1251 after it has been updated in a step S503 of FIG. 5.

FIG. 7A shows an example of the port information table 1251 after it has been updated in a step S507 of FIG. 5.

FIG. 7B shows an example of the port information table 1251 after it has been updated in a step S508 of FIG. 5.

FIG. 8A shows an example of the port information table 1251 after it has been updated in the step S507 of FIG. 5.

FIG. 8B shows an example of the port information table 1251 after it has been updated in the step S508 of FIG. 5.

FIG. 9A shows an example of the port information table 1251 after it has been updated in a step S511 of FIG. 5.

FIG. 9B shows an example of the port information table 1251 after it has been updated in a step S513 of FIG. 5.

FIG. 10 shows an example of the port information table 1251 after it has been updated in a step S514 of FIG. 5.

FIG. 12A shows an example of the port information table 1251 before the start of the processing shown in FIG. 11.

FIG. 12B shows an example of the port information table 1251 after it has been updated in a step S1101 of FIG. 11.

FIG. 13A shows an example of the port information table 1251 after it has been updated in a step S1105 of FIG. 11.

FIG. 13B shows an example of the port information table 1251 after it has been updated in a step S1106 of FIG. 11.

FIG. 14A shows an example of the port information table 1251 after it has been updated in the step S1105 of FIG. 11.

FIG. 14B shows an example of the port information table 1251 after it has been updated in a step S1106 of FIG. 11.

FIG. 15A shows an example of the port information table 1251 after it has been updated in the step S1101 of FIG. 11.

FIG. 15B shows an example of the port information table 1251 after it has been updated in the step S1105 of FIG. 11.

FIG. 16A shows an example of the port information table 1251 after it has been updated in the step S1106 of FIG. 11.

FIG. 16B shows an example of the port information table 1251 after it has been updated in the step S1105 of FIG. 11.

FIG. 17 shows an example of the port information table 1251 after it has been updated in the step S1106 of FIG. 11.

FIG. 20A shows an example of the port information table 1251 before the start of port recovery processing.

FIG. 20B shows an example of the port information table 1251 after it has been updated in a step S1801 of FIG. 18.

FIG. 21A shows an example of the port information table 1251 after it has been updated in a step S1805 of FIG. 18.

FIG. 21B shows an example of the port information table 1251 after it has been updated in a step S1806 of FIG. 18.

FIG. 22A shows an example of the port information table 1251 after it has been updated in the step S1805 of FIG. 18.

FIG. 22B shows an example of the port information table 1251 after it has been updated in the step S1806 of FIG. 18.

FIG. 23A shows an example of the port information table 1251 after it has been updated in a step S1902 of FIG. 19.

FIG. 23B shows an example of the port information table 1251 after it has been updated in a step S1908 of FIG. 19.

FIG. 24A shows an example of the port information table 1251 after it has been updated in a step S1909 of FIG. 19.

FIG. 24B shows an example of the port information table 1251 after it has been updated in the step S1908 of FIG. 19.

FIG. 25A shows an example of the port information table 1251 after it has been updated in the step S1909 of FIG. 19.

FIG. 25B shows an example of the port information table 1251 after it has been updated in the step S1908 of FIG. 19.

FIG. 26 shows an example of the port information table 1251 after it has been updated in the step S1909 of FIG. 19.

FIG. 28A shows an example of the port information table 1251 before the start of path recovery processing.

FIG. 28B shows an example of the port information table 1251 after it has been updated in a step S2702 of FIG. 27.

FIG. 29A shows an example of the port information table 1251 after it has been updated in a step S2705 of FIG. 27.

FIG. 29B shows an example of the port information table 1251 after it has been updated in a step S2706 of FIG. 27.

FIG. 30A shows another example of the port information table 1251 before the start of path recovery processing.

FIG. 30B shows an example of the port information table 1251 after it has been updated in the step S2702 of FIG. 27.

EXPLANATION OF THE REFERENCE SYMBOLS

110 . . . storage system

BEST MODE FOR CARRYING OUT THE INVENTION

In the following, an embodiment of the present invention will be explained with reference to the drawings. It should be understood that although, in the following explanation of the processing, in order to avoid prolixity, a computer program may appear as a grammatical subject, actually this processing is performed by a processor which executes the computer program. Moreover, a host device (hereinafter termed the "host") is employed as an example of an external device.

Figure 1:
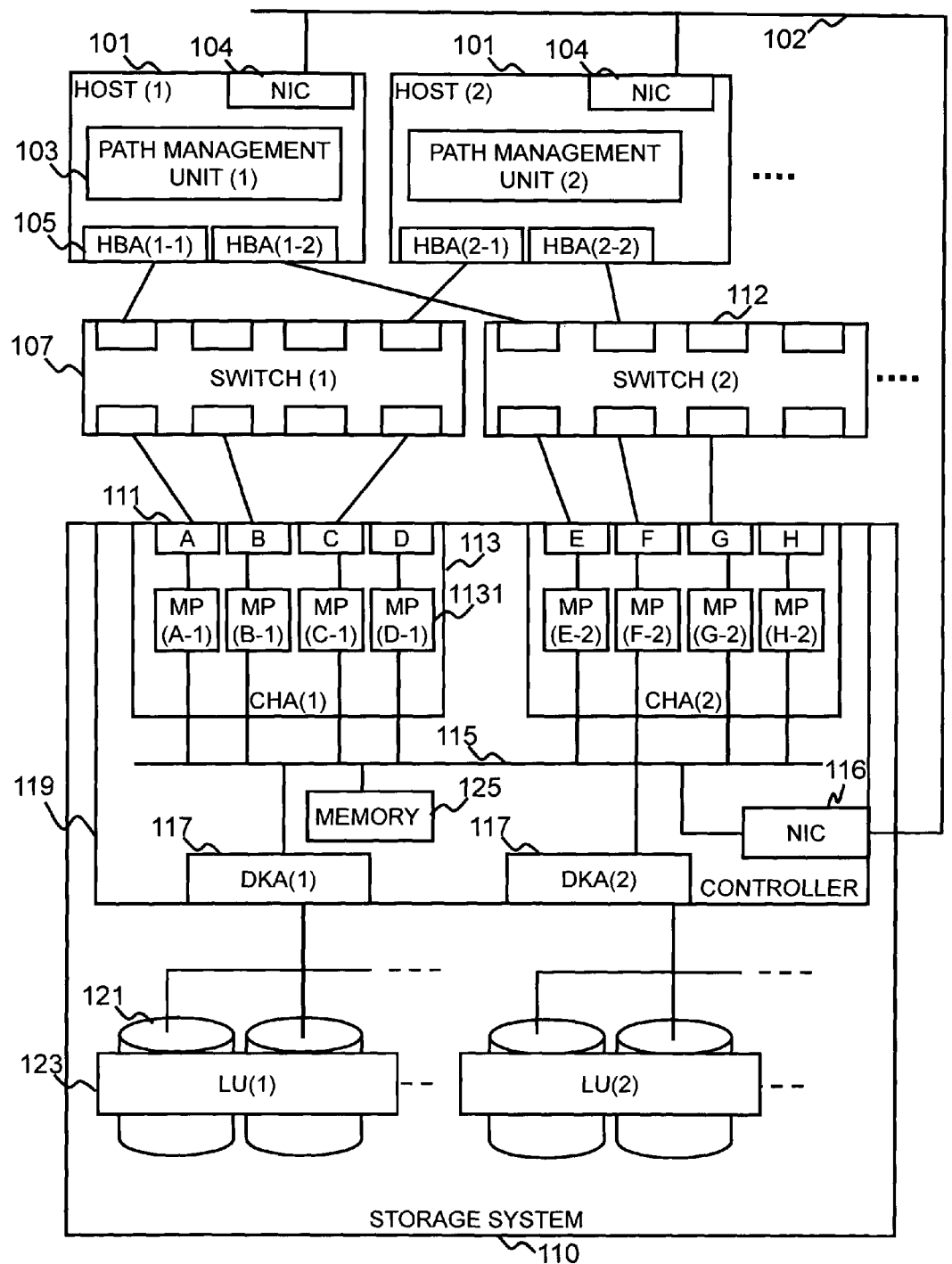
FIG. 1 shows the structure of a computer system according to an embodiment of the present invention.

FIG. 1 shows the structure of a computer system according to an embodiment of the present invention. It should be understood that, in the following explanation, when the explanation needs to distinguish elements of the same type, numbers in sequence will be affixed to the elements in the explanation (for example, "host (1)", "host (2)", . . . ), whereas, when elements of the same type need not be distinguished, the explanation will use only reference symbols to refer to the elements (for example, "host 101").

One or a plurality of hosts 101 and one or a (or more) storage systems 110 are connected to a LAN (Local Area Network) 102. This plurality of hosts 101 and storage systems 110 may be connected by one or a plurality of switches 107 (for example, FC (Fiber Channel) switches). The plurality of switches 107 are structural elements of a SAN (Storage Area Network). It would also be acceptable to use a communication network of a different type for at least one of the LAN 102 and the SAN.

The host 101 is a computer which comprises, for example, a CPU (Central Processing Unit), a memory, a NIC (Network Interface Card) 104, one or more HBAs (Host Bus Adapter) 105, and so on, and may be, for example, a personal computer, a work station, a main frame, or the like. Although this feature is not shown in the figures, each HBA 105 has at least one port, and this port is connected to some port 112 of a switch 107. Moreover, a path management unit 103 is provided by one of the computer programs executed by the CPU of the host 101. This path management unit 103, for example, for each LU 123 which the host 101 can access, manages a plurality of paths between the host 101 and the LU 123. This plurality of paths includes a path which is being used as an I/O (input/Output) path and one or more paths which are being used as alternate paths. The path which is being used as an I/O path is a path which is used when the external device issues an I/O command, and the path which is being used as an alternate path is a path which can be used as an I/O path.

The storage system 110 may be, for example, a RAID (Redundant Array of Independent (or Inexpensive) Disks) system which comprises a large number of physical storage devices 121 arranged as an array. This storage system 110 may be broadly divided into a controller 119 and a group of storage devices.

The controller 119 may comprise, for example, a channel adapter (CHA) 113, a disk adapter (DKA) 117, a memory 125, a NIC 116, and a connection unit 115.

The CHA 113 is an interface device which performs data communication with the host 101. This CHA 113, for example, may consist of a micro computer system (for example a circuit board) which comprises an MP (Micro Processor) 1131, a memory, and a plurality of ports 111 and so on. For example, when the MP 1131 within the CHA 113 has received a write command as an I/O command from the host 101, it may write data according to this write command which it has received into the memory 125 (a cache region), and may order the DKA 117 to write this data. Moreover, for example, when the MPA 1131 within the CHA 113 has received a read command from the host 101 as an I/O command, it may order the DKA 117 to read out data according to this read command which it has received, thus reading out data according to this command from the memory 125 (the cache region), and may then transmit this data to the host 101.

The DKA 117 is an interface device which performs data communication with a physical storage device 121. The DKA 117 may also consist of a micro computer system (for example a circuit board) which comprises an MP, a memory, and a plurality of ports and so on. For example, in response to a write command from the CHA 113, the DKA 117 may write data which is stored in the memory 125 (the cache region) to the physical storage device 121. Moreover, for example, in response to a read out command from the CHA 113, the DKA 117 may read data from the physical storage device 121 according to this command, and may write it into the memory 125 (the cache region).

The memory 125 is, for example, a volatile (or a non-volatile) memory, and comprises a cache region and a control region. Data which has been received from the host 101, or data which has been read out from the physical storage device 121, is temporarily stored in the cache region. And information which is referred to by the CHA 113 or the DKA 117 for controlling the storage system 110 (hereinafter termed control information) is stored in the control region.

The connection unit 115 connects the CHA 113, the DKA 117, the NIC 116, and the memory 125 mutually together. This connection unit 115, for example, may be constituted by an ultra high speed crossbar switch which performs data transmission by high speed switching operation, or by a bus.

For example, a device such as a hard disk, a magnetic tape, a semiconductor memory (for example a flash memory), or an optical disk or the like may be used as the physical storage device 121. A RAID group of a predetermined RAID level (sometimes also termed a "parity group" or an "array group") may be constituted by two or more physical storage devices 121. An LU (Logical Unit) 123 may be constituted using the storage space of two or more of the physical storage devices 121 which constitute a RAID group. An LU is a logical storage device.

The above describes the structure of the computer system according to this embodiment. It should be understood that the shown structure of this computer system is only an example; it would also be acceptable to employ some other type of structure. For example, it would also be acceptable to build the controller 119 as a circuit board which comprises an MP, a memory, and a plurality of ports (in other words, with a structure which is simpler than that of the controller 119 of FIG. 1). Furthermore, for example, while according to FIG. 1 one MP 1131 is provided for one port 111 (in other words the ports 111 and the MPs 1131 correspond one to one), it would also be acceptable for a plurality of MPs 1131 to be provided for one port 111; or it would also be acceptable for one MP 1131 to be provided for a plurality of the ports 111; or it would also be acceptable for each of the MPs 1131 to be capable of corresponding to any of the ports 111, even though the number of the ports 111 is the same as the number of MPs 1131.

In the following, a summary of this embodiment will be explained with reference to FIGS. 2 and 3.

A host (2) is capable of accessing an LU (1), and the three paths P2-1, P2-2, and P2-3 extend between the host (2) and the LU (1). The path P2-1 is connected from an HBA (2-1) via a switch (1) to a port A of a CHA (1). The path P2-2 is connected from an HBA (2-2) via a switch (2) to a port F of a CHA (2). And the path P2-3 is connected from the HBA (2-2) via the switch (2) to a port G of the CHA (2). Thus, the paths P2-2 and P2-3 are connected to different ports of the switch (2). At the present time point, as shown by the solid line, the path P2-2 is being used as an I/O path, and, as shown by the dotted lines, the paths P2-1 and P2-3 are being used as alternate paths. A path management unit (2) manages information related to these three paths P2-1, P2-2, and P2-3 (for example, which path is being used as the I/O path and which paths are being used as alternate paths).

A port information table 1251 and an LU definition table 1252 are stored as control information in the memory 125. The port information table 1251 is a table for managing information related to the plurality of ports in a unified manner. Information related to the status of each of the plurality of ports A through H is kept in this port information table 1251. And, for each LU, information is kept in the LU definition table 1252 related to hosts which can originate access, and information related to the ports 111 which correspond to this LU. For example, to consider the example shown in FIG. 2, information is kept in the LU definition table 1252 which specifies that the host which can become an origin of access to the LU (1) is the host (2), that the ports A, F, and G correspond to this LU (1), and that the association of the port F to the LU (1) is active. The reason why is that the path P2-2 is being used as the I/O path, and consequently an I/O command from the host (2) which designates the LU (1) is received by the port F.

A path changeover support program 3100 is executed by at least one among the plurality of MPs 1131. This path changeover support program 3100 provides support so as to ensure that, during path changeover performed by the host, a path which is currently anomalous is not selected as the path to which changeover of the I/O path is performed.

A summary of the flow of processing performed by this embodiment is as follows.

Figure 2:
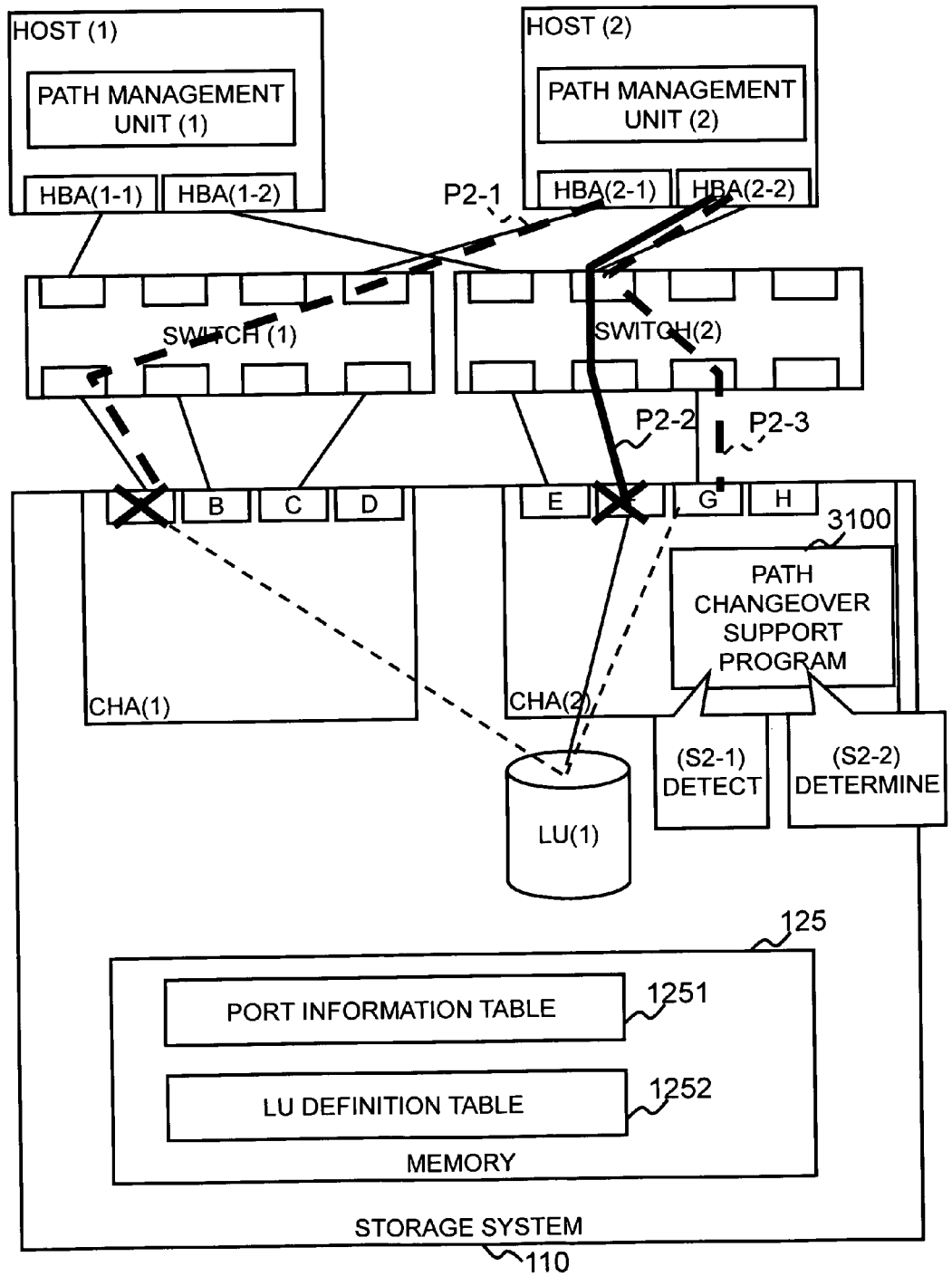
FIG. 2 shows an outline of a portion of processing performed by this embodiment of the present invention.

That is, as shown at S2-1 in FIG. 2, the path changeover support program 3100 detects that the path P2-2 is anomalous. In concrete terms, for example, the path changeover support program 3100 may detect that the path P2-2 is anomalous by any one of the following methods (2-1-A) through (2-1-C):

(2-1-A) The program 3100 may receive a notification from the path management unit (2), for example via the LAN 102, to the effect that a fault has been detected in the path P2-2;

(2-1-B) The occurrence of a fault at the port F may be detected;

(2-1-C) By referring to the port information table 1251, it may be detected that the status of the port F is "maintenance".

Next, at S2-2, the path changeover support program 3100 detects that the path P2-2 which is anomalous is being used by the host (2) as the I/O path, and determines a path as the path to which changeover of the I/O path for the host (2) should be performed. In concrete terms, for example, by referring to the port information table 1251, the path changeover support program 3100 detects that, for the host (2), the ports which are connected to the paths which are being used as alternate paths are the ports A and G, and moreover that the port A is currently anomalous. Due to this, the path changeover support program 3100 selects the port G, which is the one of the ports A and G which is functioning normally. By the port G being selected, is meant that the path which is connected to the port G (i.e. the path which is being used as an alternate path) is selected as the path to which changeover of the I/O path is to be performed.

Figure 3:
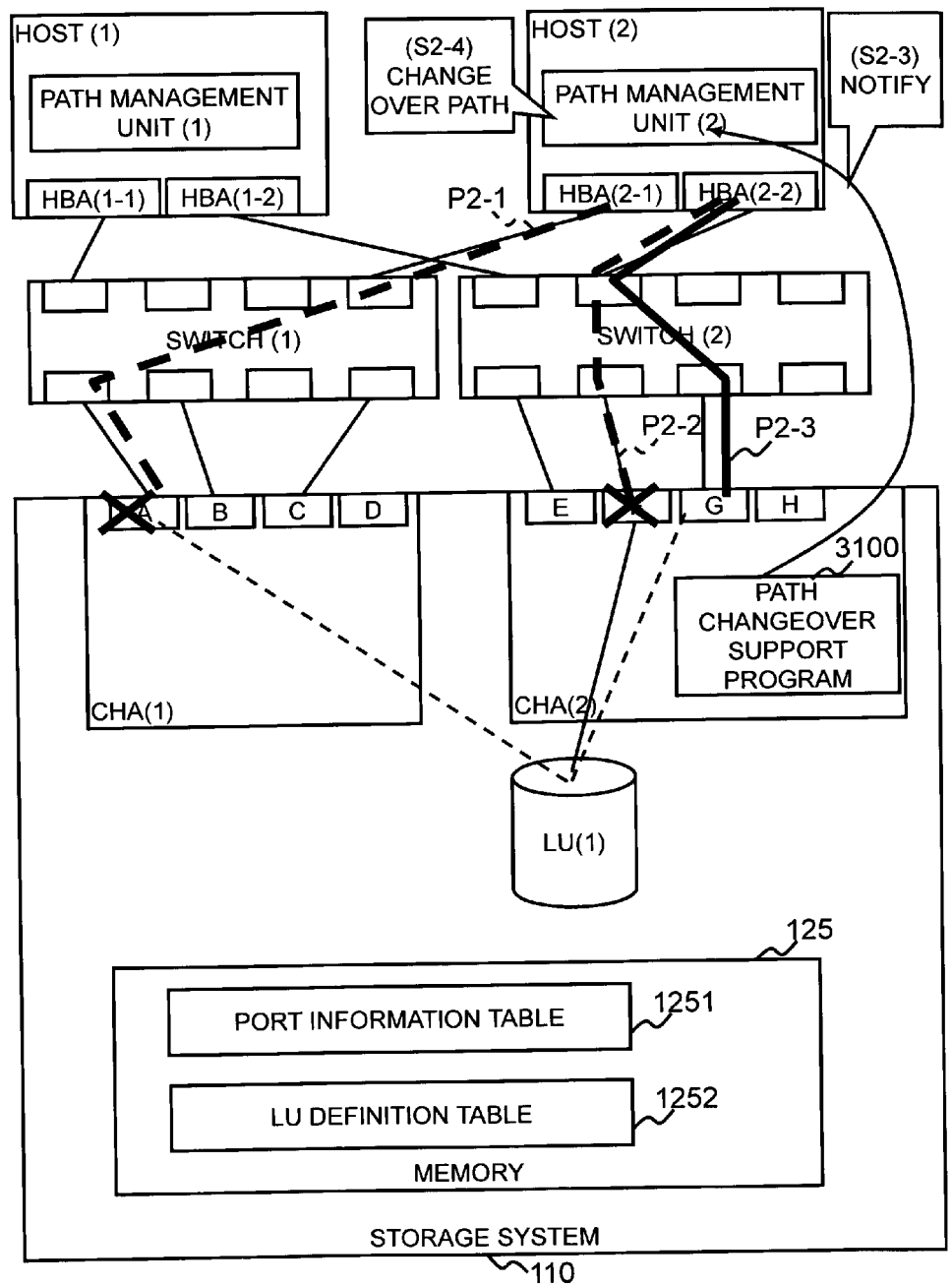
FIG. 3 shows the remainder of this processing performed by the embodiment of the present invention.

Next, as shown at S2-3 in FIG. 3, the path changeover support program 3100 notifies to the host (2) information related to the port G which has been selected at S2-2 (for example, the identifier of the port (i.e. the port ID)). This information related to the port G may be notified, for example, via the LAN 102.

Finally, at S2-4, based upon the information which has been notified from the path changeover support program 3100, the path management unit (2) in the host (2) specifies the port G, and, as shown by the thick line, changes over the path P2-3 which connects to the port G (a path which is currently being used as an alternate path) so that it becomes the path which is used as the I/O path. The path P2-2 which was being used as the I/O path is now managed as an alternate path, as shown by the dashed line.

Due to the above procedure, it is possible to eliminate the undesirable possibility that the anomalous path P2-1 will be selected as the path to which changeover of the I/O path is performed.

In the following, this embodiment will be explained in detail.

Figure 31:
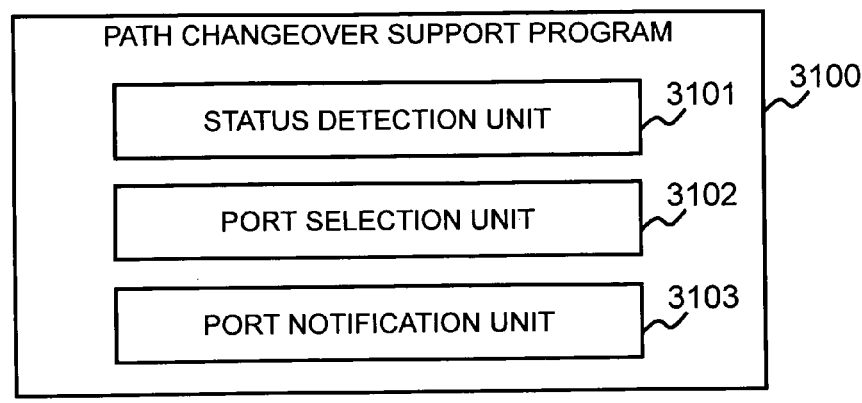
FIG. 31 is a functional block diagram of a path changeover support program 3100.

FIG. 31 is a functional block diagram of the path changeover support program 3100.

The path changeover support program 3100 is, for example, endowed with the functions of a status detection unit 3101, a port selection unit 3102, and a port notification unit 3103.

The status detection unit 3101 detects change from "normal" to anomalous of the status of any one of the ports A through H. As far as the method of detection is concerned, any of the methods (2-1-A) through (2-1-C) described above is acceptable.

For a host which is using a path for which an anomaly has been detected as an I/O path (hereinafter, in the explanation of FIG. 31, this will be termed the "subject host"), the port selection unit 3102 selects, on the basis of the port management information 1251, a port whose status is "normal" from among one or more ports related to one or more paths which are being used as alternate paths.

The port notification unit 3103 notifies to the subject host information related to the port which has been selected by the port selection unit 3102, as being information related to the port related to the path which is to be taken as the I/O path instead of the anomalous path.

FIG. 4 shows the structure of the port information table 1251. It should be understood that the details of the table 1251 shown in FIG. 4 do not particularly correspond to the details shown in FIGS. 2 and 3.

In this port information table 1251, for each of the ports 111, there is recorded a port ID, a port status, the number of I/O hosts, and host information for each host. The host information consists of an I/O execution priority (hereinafter termed the "priority"), an I/O execution port flag (hereinafter termed the "port flag"), a path fault flag (hereinafter termed the "path flag"), and the total number of paths. In the following, the various items of information will be explained by taking one port (termed the "subject port") as an example.

The port ID is an identifier for the subject port. The port IDs A through H shown in FIG. 4 correspond to the ports A through H shown in FIG. 1.

The port status is information which specifies the status of the subject port. This port status can be "0" ("normal"), "1" (port fault), or "2" (maintenance). "1" (port fault) means that a fault has occurred in the port 111 itself. And "2" (maintenance) means that the port 111 has acquired this status due to maintenance. Maintenance is performed upon the CHA unit, and for this reason, if for example CHA (2) is the subject of maintenance, then, as shown in FIG. 4, the port status of the ports E through H which are possessed by CHA (2) is set to "2".

The number of I/O hosts is the number of the port flags which are "ON" for the subject port. For example, the number of I/O hosts for the port A is 2, and the reason for this is that the number of port flags which are "ON" for the port A is 2.

The priority is the priority of the subject port. The smaller the numerical value is, the higher is the priority. Due to this, in the example of FIG. 4, the priority "1" is the highest priority. The priority is used during port selection. Valid values ("1", "2" and the like) are set as priorities only for the ports which are related to paths which are being managed by the host. To put this in another manner, it is understood that the ports corresponding to paths for which valid values are set as priorities are the ports related to the paths which are being managed by the host. In concrete terms, to consider the host (7), the paths for which valid values are set as the priorities are the six paths corresponding to the ports A through C and E through G, and consequently it will be understood that the host (7) is managing the six paths which are related to the ports A through C and E through G.

The port flag is information which specifies whether or not the path related to the subject port is being used as an I/O path. If the path related to the subject port is being used as an I/O path, then, for the subject port, this port flag is set to "ON". Due to this it will be understood that, in the example of FIG. 4, the host (1) and the host (7) are using the path related to the port A as an I/O path.

The path flag is information which specifies whether or not a path fault is currently occurring upon a path related to the subject port. If a path fault is currently occurring upon a path related to the subject port, then this path flag for the subject port is set to "ON". Due to this it will be understood that, in the example of FIG. 4, among the plurality of paths which are being managed by the host (8), a path fault is occurring in the path related to the port B. It should be understood that a path fault is a fault which is due to some reason other than a port fault (which is a fault in the port itself). Accordingly, the path flag is not set to "ON" for a path for which the port status is currently set to "1" (faulty), and, similarly, the port status is not set to "1" (faulty) for a path for which the path flag is set to "ON".

And the total number of paths is the total number of paths which connect to the host; in concrete terms, this is the total number of the path which is being used as an I/O path and the paths which are being used as alternate paths. For example, to consider the host (7), the total number of paths being "6" means that the number of paths which connect to the host (7) is 6—in concrete terms, that the number of paths for which valid values are set as priorities is 6.

In the following, various processes related to implementation of this embodiment will be explained. It should be understood that, in the following explanation, as appropriate, figures are referred to which show the port information table after updating. In these figures, the character font used for the regions which have been updated is larger than the character font used for the other areas. Moreover, the regions which have been updated are shown in bold italics.

FIG. 5 shows the flow of processing which is performed when the host has detected that some fault has occurred in a path. In the following, for the purposes of explanation, an example will be discussed in which the path management unit (1) within the host (1) has detected that a fault has occurred in a path related to the port A. It should be understood that FIG. 6A shows the port information table 1251 before the start of the processing shown in FIG. 5. According to FIG. 6A, among the ports A through H, the ports A and E are valid ports. This is because no priority is set for the ports other than A and E.

The path management unit (1) is using the path related to the port A as an I/O path, and issues I/O commands via this I/O path. At this time, the path management unit (1) detects that a fault is occurring in a path which is related to the port A. In this case, the path management unit (1) notifies information which specifies that a fault is occurring in a path which is related to the port A (hereinafter referred to as "fault information (A)") to the storage system 110. This fault information (A) is notified, for example, via the LAN 102.

In a step S501, the path management support program 3100 (for example, the program 3100 which is being executed by the MP (A-1) which corresponds to the port A) receives the fault information (A). To express this in a different manner, the status detection unit 3101 within the path management support program 3100 detects that a fault is occurring with a path related to the port A.

In the next step S502, the status detection unit 3101 decides whether or not a port fault has occurred with the port A. If the decision result in this step S502 is affirmative (YES in the step S502), then the flow of control proceeds to a step S503, whereas if the decision result in this step S502 is negative (NO in the step S502), then the flow of control is transferred to a step S511.

In the step S503, the port selection unit 3102 within the path management support program 3100 changes the port status corresponding to the port A in the port information table 1251 from "0" ("normal") to "1" (faulty) (refer to FIG. 6B).

In the next step S504, the port selection unit 3102 decides whether or not the port change over has been completed. In concrete terms, the port selection unit 3102 decides whether or not, for all of the hosts (1) and (7) which are using paths related to the port A as I/O paths, processing (the steps S505 through S509) related to taking paths related to the ports which are different from the port A as paths to which the I/O paths are to be changed over has been executed. If the decision result in this step S504 is affirmative (YES in the step S504), then this processing terminates, whereas if the decision result in this step S504 is negative (NO in the step S504), then the flow of control proceeds to a step S505.

In this step S505, the port selection unit 3102 selects, from the subject hosts among the subject host group for which processing has not yet been performed, that subject host for which the total number of paths is the fewest. Here by "subject host" is meant those hosts (the host (1) and the host (7)) which are using paths related to the port A as I/O paths, and "subject host group" means the collection of the subject hosts. And "subject hosts for which processing has not yet been performed" means the subject hosts for which the processing of the steps S505 through S509 has not been performed yet. While, in the step S505, the subject hosts are the host (1) and the host (7), the host (1) is selected first, since the total number of paths is less for that host (1).

In the next step S506, on the basis of the number of I/O hosts at all the valid ports other than the port A, and the priority for the subject host (1) which was selected in the step S505, the port selection unit 3102 selects one "normal" port (i.e. a port whose port status is "0") from the one or more other ports (the ports other than the port A) which are related to the one or more other paths connected to the subject host (1) (i.e. the paths apart from paths which are related to the port A). A "normal" port is selected in order for the number of I/O hosts for all of the valid ports apart from the port A to become as equal as possible. The reason why is that, if the number of I/O hosts at some valid port becomes high, then the load upon this valid port becomes high, and there is a fear that the processing performance for I/O commands may be deteriorated (for example it is because there is a fear that, if a path which is related to this valid port is taken as an I/O path, then the response time from when the host transmits an I/O command until a response is received may become long). Here the port E is selected as this "normal" port, since the only other ports for the subject host (1) is the port E, and the port status of the port E is "0".

In the next step S507, for the host (1), the port selection unit 3102 changes the subject for which the port flag is "ON" from the port A to the port E which was selected in the step S506 (refer to FIG. 7A).

In the next step S508, along with the processing of the step S507, as shown in FIG. 7B, the port selection unit 3102 reduces the number of I/O hosts for the port A by 1 (i.e. changes it from "2" to "1"), and increases the number of I/O hosts for the port E by 1 (i.e. changes it from "1" to "2").

In the next step S509, the port notification unit 3103 notifies information related to the port E which was selected in the step S506 (for example the port ID "E") to the host (1). Due to this, the host (1) is able to change over the path which is being used as an I/O path to a path which is related to the "normal" port E.

After the step S509 has been performed for the host (1), then the decision result of the step S504 becomes negative (NO in the step S504), and in the step S505 the host (7) is selected, and the processing of the steps S506 through S509 is performed for the host (7). The reason why is that, according to the example shown in FIG. 6A, the hosts which are using paths related to the port A as I/O paths (that is to say, the subject hosts) are not only the host (1), but also the host (7).

For the host (7), the steps S506 through S509 are as follows. It should be understood that the port information table 1251 at this time is as shown in FIG. 7B.

That is, in the step S506, on the basis of the number of I/O hosts at all the valid ports other than the port A and the priority for the subject host (7) which was selected in the step S505, the port selection unit 3102 selects one "normal" port from the one or more other ports (the ports other than the port A) which are related to the one or more other paths connected to the subject host (7) (i.e. the paths apart from paths which are related to the port A). A "normal" port is selected in order for the number of I/O hosts for all of the valid ports apart from the port A to become as equal as possible. Here the other ports for the subject host (7) are the five ports B, C, E, F, and G, and, since the port status of each of these five ports is "0", any one of them may be selected as the "normal" port. However, since the number of I/O hosts for the ports B, C, and E is "2", if any one of the ports B, C, or E is selected, then the number of I/O hosts for the port B, C, or E is increased to "3", so that the variation of the number of I/O hosts for valid ports is increased. Due to this, the ports which can be selected are the ports F and G, for which the number of I/O hosts is "1". Whichever one of the ports F and G is selected, there will be a contribution to equalization of the number of I/O hosts for valid ports. In this type of case, the port F is selected from the ports F and G, because its priority is the higher.

In the step S507, for the host (7), the port selection unit 3102 changes the subject for which the port flag is "ON" from the port A to the port F which was selected in the step S506 (refer to FIG. 8A).

In the next step S508, along with the processing of the step S507, as shown in FIG. 8B, the port selection unit 3102 reduces the number of I/O hosts for the port A by 1 (i.e. changes it from "1" to no value), and increases the number of I/O hosts for the port F by 1 (i.e. changes it from "1" to "2").

In the next step S509, the port notification unit 3103 notifies information related to the port F which was selected in the step S506 (for example the port ID "F") to the host (7). Due to this, the host (7) is able to change over the path which is being used as an I/O path to a path which is related to the "normal" port F.

Due to the processing described above, as shown in FIG. 8B, the number of I/O hosts for the port A becomes none (i.e. the number of I/O hosts is 0). Consequently, the result of the decision in the step S504 performed subsequently becomes affirmative (YES in the step S504), and processing terminates.

On the other hand, if the result of the decision in the step S502 is negative (NO in the step S502), in other words if no port fault has been detected for the port A, then, as previously described, the step S511 is performed.

In this step S511, for the host (1) which is the origin of transmission of the fault information (A), the port selection unit 3102 sets "ON" as the path flag which corresponds to the port A in the port information table 1251 (refer to FIG. 9A).

And in the subsequent steps S512 through S515, for the host (1) which is the origin of transmission of the fault information (A), processing which is similar to the processing of the steps S506 through S509 which has been explained for the host (1) is performed. Due to this, the port information table 1251 is updated, as shown in FIGS. 9B and 10.

As will be understood from the above, if the fault information (A) has been notified from the host (1), and if it has been detected that a port fault has occurred in the port A, then, for all of the hosts which are using paths related to the port A as I/O paths, processing is performed to change over the port which is used for the I/O path from the port A to some other port. On the other hand, if it has not been detected that a port fault has taken place with the port A, then processing is performed only for the host (1) to change over the port which is used for the I/O path from the port A to some other port.

Figure 11:
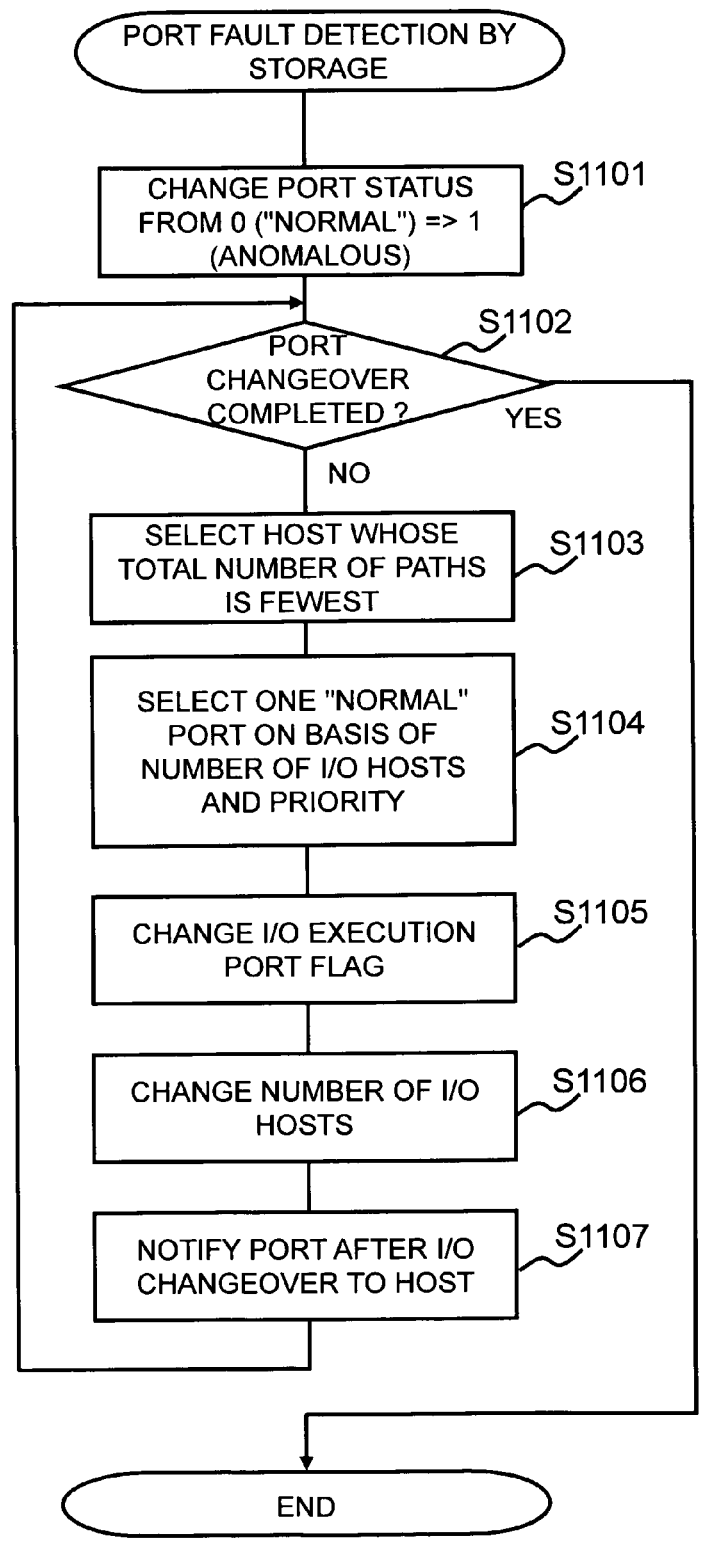
FIG. 11 shows a flow of processing which is performed when an MP 1131 has detected a port fault.

FIG. 11 shows the flow of processing which is performed when the MP 1131 has detected a port fault. In the following, for the sake of explanation, an example will be presented in which the MP (B-1) (in concrete terms, the status detection unit 3101 within the path changeover support program 3100 which is being executed by the MP (B-1)) has detected that a port fault has occurred with the port B. It should be understood that FIG. 12A shows the port information table 1251 before the start of the processing shown in FIG. 11.

In a step S1101, the port selection unit 3102 changes the port status corresponding to the port B in the port information table 1251 from "0" ("normal") to "1" (faulty) (refer to FIG. 12B).

In the next step S1102, the port selection unit 3102 decides whether or not the port change over has been completed. In concrete terms, the port selection unit 3102 decides whether or not, for all of the hosts (2) and (8) which are using paths related to the port B as I/O paths, processing (the steps S1103 through S1107) has been executed related to taking paths related to the ports which are different from the port B as paths to which the I/O paths are to be changed over. If the decision result in this step S1102 is affirmative (YES in the step S1102), then this processing terminates, whereas if the decision result in this step S1102 is negative (NO in the step S1102), then the flow of control proceeds to a step S1103.

In this step S1103, the port selection unit 3102 selects, from the subject hosts among the subject host group for which processing has not yet been performed, that subject host for which the total number of paths is the fewest. Here by "subject host" is meant those hosts (the host (2) and the host (8)) which are using paths related to the port B as I/O paths, and "subject host group" means the collection of the subject hosts. And "subject hosts for which processing has not yet been performed" means the subject hosts for which the processing of the steps S1103 through S1107 has not been performed yet. While, in the step S1103, the subject hosts are the host (2) and the host (8), the host (2) is selected first, since the total number of paths is less than that host (2).

In the next step S1104, on the basis of the number of I/O hosts at all the valid ports other than the port B and the priority for the subject host (2) which was selected in the step S1103, the port selection unit 3102 selects one "normal" port from the one or more other ports (the ports other than the port B) which are related to the one or more other paths connected to the subject host (2) (i.e. the paths apart from paths which are related to the port B). A "normal" port is selected in order for the number of I/O hosts for all of the valid ports apart from the port B to become as equal as possible. Here the port F is selected as this "normal" port, since the other ports for the subject host (2) are only the port F, and the port status of the port F is "0".

In the next step S1105, for the host (2), the port selection unit 3102 changes the subject for which the port flag is "ON" from the port B to the port F which was selected in the step S1104 (refer to FIG. 13A).

In the next step S1106, along with the processing of the step S1105, as shown in FIG. 13B, the port selection unit 3102 reduces the number of I/O hosts for the port B by 1 (i.e. changes it from "2" to "1"), and increases the number of I/O hosts for the port F by 1 (i.e. changes it from "1" to "2").

In the next step S1107, the port notification unit 3103 notifies information related to the port F which was selected in the step S1104 (for example the port ID "F") to the host (2). Due to this, the host (2) is able to change over the path which is being used as an I/O path to a path which is related to the "normal" port F.

After the step S1107 has been performed for the host (2), then the decision result of the step S1102 becomes negative (NO in the step S1102), and in the step S1103 the host (8) is selected, and the processing of the steps S1104 through S1107 is performed for the host (8). The reason why is that, according to the example shown in FIG. 12A, the hosts which are using paths related to the port B as I/O paths (that is to say, the subject hosts) are not only the host (2), but also the host (8).

For the host (8), the steps S1104 through S1107 are as follows. It should be understood that the port information table 1251 at this time is as shown in FIG. 13B.

That is, in the step S1104, on the basis of the number of I/O hosts at all the valid ports other than the port B and the priority for the subject host (8) which was selected in the step S1103, the port selection unit 3102 selects one "normal" port from the one or more other ports (the ports other than the port B) which are related to the one or more other paths connected to the subject host (8) (i.e. the paths other than the paths which are related to the port B). A "normal" port is selected in order for the number of I/O hosts for the valid ports to become as equal as possible. Here the other ports for the subject host (8) are the five ports A, C, E, F, and G, and, since the port status of each of these five ports is "0", any one of them may be selected as the "normal" port. However, since the number of I/O hosts for the ports A, C, and F is "2", if any one of the ports A, C, or F is selected, then the number of I/O hosts for the port A, C, or F will be increased to "3", so that the variation of the number of I/O hosts for the valid ports will be increased. Due to this, the ports which can be selected are the ports E and G, for which the number of I/O hosts is "1". Whichever of the ports E and G is selected, there will be a contribution to equalization of the number of I/O hosts for the valid ports. In this type of case, as previously described, the port E is selected because its priority is the higher.

In the step S1105, for the host (8), the port selection unit 3102 changes the subject for which the port flag is "ON" from the port B to the port E which was selected in the step S1104 (refer to FIG. 14A).

In the next step S1106, along with the processing of the step S1105, as shown in FIG. 14B, the port selection unit 3102 reduces the number of I/O hosts for the port B by 1 (i.e. changes it from "1" to no value), and increases the number of I/O hosts for the port E by 1 (i.e. changes it from "1" to "2").

In the next step S1107, the port notification unit 3103 notifies information related to the port E which was selected in the step S1106 (for example the port ID "E") to the host (8). Due to this, the host (8) is able to change over the path which is being used as an I/O path to a path which is related to the "normal" port E.

It should be understood that if, subsequently, a port fault occurs for the port A, and this port fault has been detected by the status detection unit 3101 within the path changeover support program 3100 which is being executed by the MP (A-1) which corresponds to the port A, then similar processing is performed to the processing which has been explained with reference to FIG. 11. In concrete terms, the following processing takes place.

In the step S1101, the port selection unit 3102 changes the port status corresponding to the port A in the port information table 1251 from "0" ("normal") to "1" (faulty) (and performs updating from the table 1251 shown in FIG. 14B to the table 1251 shown in FIG. 15A).

In the next step S1102, the port selection unit 3102 decides whether or not the port change over has been completed. Here, if the decision result in this step S1102 is negative (NO in the step S1102), then the flow of control proceeds to a step S1103.

In this step S1103, the port selection unit 3102 selects, from the subject hosts (1) and (7) which are using a path related to the port A as an I/O path, that subject host (1) for which the total number of paths is the fewest.

In the next step S1104, on the basis of the number of I/O hosts at all the valid ports other than the ports A and B and the priority for the subject host (1) which was selected in the step S1103, the port selection unit 3102 selects one "normal" port E from the one or more other ports (the ports other than the ports A and B) which are related to the one or more other paths connected to the subject host (1) (i.e. the paths apart from paths which are related to the ports A and B).

And in the next step S1105, for the host (1), the port selection unit 3102 changes the subject for which the port flag is "ON" from the port A to the port E which was selected in the step S1104 (refer to FIG. 15B).

In the next step S1106, along with the processing of the step S1105, as shown in FIG. 16A, the port selection unit 3102 reduces the number of I/O hosts for the port A by 1 (i.e. changes it from "2" to "1"), and increases the number of I/O hosts for the port E by 1 (i.e. changes it from "2" to "3").

In the next step S1107, the port notification unit 3103 notifies information related to the port E which was selected in the step S1104 (for example the port ID "E") to the host (1). Due to this, the host (1) is able to change over the path which is being used as an I/O path to a path which is related to the "normal" port E.

Since the subject host (7) remains which is using a path related to the port A as an I/O path, the result of the decision in the step S1102 is NO, and the subject host (7) is selected in the step S1103.

In the next step S1104, on the basis of the number of I/O hosts at all the valid ports other than the port A and the port B and the priority for the subject host (7) which was selected in the step S1103, the port selection unit 3102 selects one "normal" port from the one or more other ports (the ports other than the ports A and B) which are related to the one or more other paths connected to the subject host (7) (i.e. the paths other than the paths which are related to the ports A and B). Here the other ports for the subject host (7) are the four ports C, E, F, and G, and, since the port status of each of these four ports is "0", any one of them may be selected as the "normal" port. However, since the number of I/O hosts for the ports C, E, and F is "1", if any one of the ports C, E, or F is selected, then the variation of the number of I/O hosts for the valid ports will be increased. Due to this, the port G is selected, for which the number of I/O hosts is "1".

In the step S1105, for the host (7), the port selection unit 3102 changes the subject for which the port flag is "ON" from the port A to the port G which was selected in the step S1104 (refer to FIG. 16B).

In the next step S1106, along with the processing of the step S1105, as shown in FIG. 17, the port selection unit 3102 reduces the number of I/O hosts for the port A by 1 (i.e. changes it from "1" to no value), and increases the number of I/O hosts for the port G by 1 (i.e. changes it from "1" to "2").

And in the next step S1107, the port notification unit 3103 notifies information related to the port G which was selected in the step S1104 (for example the port ID "G") to the host (7). Due to this, the host (7) is able to change over the path which is being used as an I/O path to a path which is related to the "normal" port G.

Figure 18:
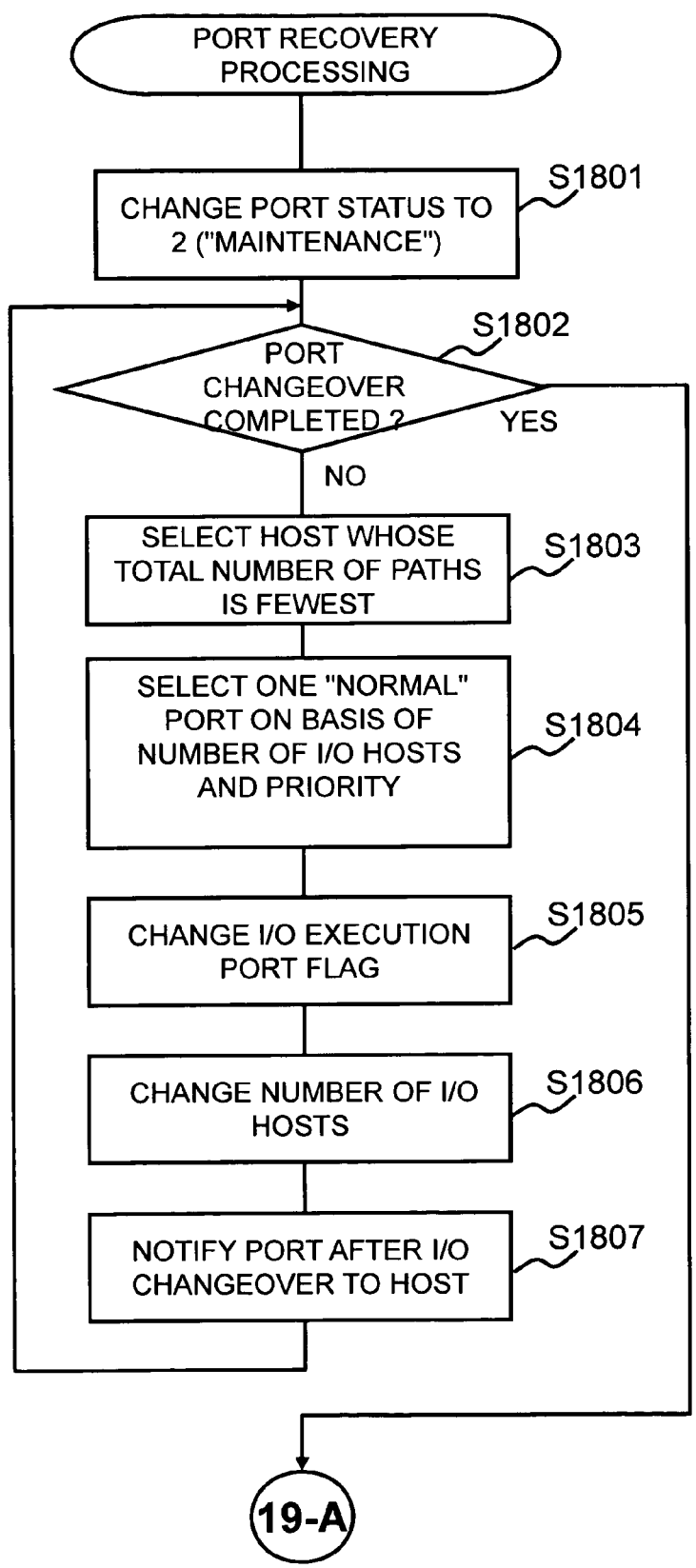
FIG. 18 shows a portion of a flow of processing for the port recovery.
Figure 19:
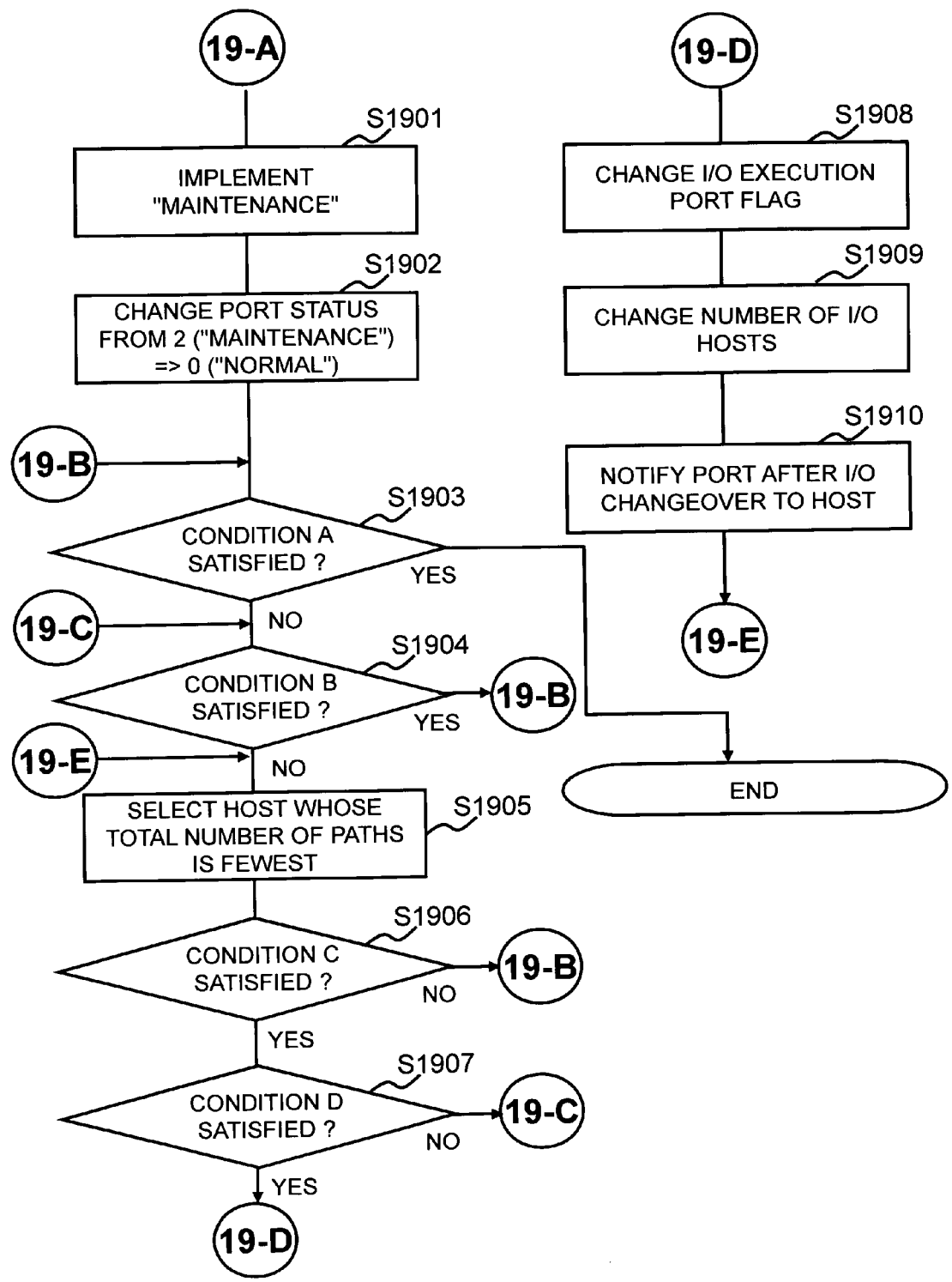
FIG. 19 shows the remainder of this port recovery processing flow.

FIGS. 18 and 19 show the flow of processing for port recovery. It should be understood that FIG. 20A shows the port information table 1251 before the port recovery processing (the processing shown in FIGS. 18 and 19). According to FIG. 20A, the table 1251 is the same as in FIG. 17, and consequently port faults are occurring at the ports A and B. Accordingly, in this example, the CHA which is to be the subject of maintenance is the CHA (1) which possesses the ports A and B.

In a step S1801, on the basis of actuation by a maintenance person upon an input and output console (not shown in the drawings), the status detection unit 3101 updates the port statuses of the ports A through D which have CHA (1) as a subject of maintenance to "2" (maintenance) (refer to FIG. 20B). To put this in another manner, the statuses of the ports A through D are manually updated by the maintenance person to "2" (maintenance). It should be understood that, instead of this manual updating, it would also be acceptable, for example, to detect that CHA (1) has been removed, and for the status detection unit 3101 to update the statuses of the ports A through D to "2" (maintenance).

In the next step S1802, the port selection unit 3102 decides whether or not the port change over has been completed. In concrete terms, the port selection unit 3102 decides whether or not, for all of the hosts (2) and (9) which are using paths related to the ports A through D as I/O paths, processing (the steps S1803 through S1807) has been executed related to taking paths related to ports which are different from the ports A through D as paths to which the I/O paths are to be changed over. (It should be understood that, for the ports A and B for which a port fault has occurred, as explained with reference to FIGS. 11 through 17, the steps S1103 through S1107 which are similar to the steps S1803 through S1807 have already been executed.) If the decision result in this step S1802 is affirmative (YES in the step S1802), then the flow of control is transferred to a step S1901 shown in FIG. 19, whereas if the decision result in this step S1802 is negative (NO in the step S1802), then the flow of control proceeds to a step S1803. It should be understood that since, in this example, among the ports A through D whose port status is "2", the number of I/O hosts is only greater than or equal to "1" for the port C, accordingly the steps S1803 through S1807 are only performed for the port C.

In this step S1803, the port selection unit 3102 selects, from the subject hosts (3) and (9), that subject host for which the total number of paths is the fewest.

In the next step S1804, on the basis of the number of I/O hosts at all the valid ports other than the ports A through D and the priority for the subject host (3) which was selected in the step S1803, the port selection unit 3102 selects one "normal" port G from the one or more other ports (the ports other than the ports A through D) which are related to the one or more other paths connected to the subject host (3) (i.e. the paths apart from paths which are related to the ports A through D).

In the next step S1805, for the host (3), the port selection unit 3102 changes the subject for which the port flag is "ON" from the port C to the port G which was selected in the step S1804 (refer to FIG. 21A).

In the next step S1806, along with the processing of the step S1805, as shown in FIG. 21B, the port selection unit 3102 reduces the number of I/O hosts for the port C by 1 (i.e. changes it from "2" to "1"), and increases the number of I/O hosts for the port G by 1 (i.e. changes it from "2" to "3").

In the next step S1807, the port notification unit 3103 notifies information related to the port G which was selected in the step S1804 (for example the port ID "G") to the host (3). Due to this, the host (3) is able to change over the path which is being used as an I/O path to a path which is related to the "normal" port G.

After the step S1807 has been performed for the host (3), then the decision result of the step S1802 becomes negative (NO in the step S1802), and in the step S1103 the host (9) is selected.

The processing of the steps S1804 through S1807 for the host (9) is performed as follows. It should be understood that, at this time point, the port information table 1251 is as shown in FIG. 21B.

That is, in the step S1804, on the basis of the number of I/O hosts at all the valid ports other than the ports A through D and the priority for the subject host (9) which was selected in the step S1803, the port selection unit 3102 selects one "normal" port from the one or more other ports (the ports other than the ports A through D) which are related to the one or more other paths connected to the subject host (9) (i.e. the paths other than the paths which are related to the ports A through D). Here the other ports for the subject host (9) are the three ports E, F, and G, and, since the port status of each of these three ports is "0", any one of them may be selected as the "normal" port. However, since the number of I/O hosts for the ports E and G is "3", if either of these ports E or G is selected, then the number of I/O hosts for the port E or G will be increased to "4", so that the variation of the number of I/O hosts for the valid ports will be increased. Due to this, the ports which is selected is the port F.

In the next step S1805, for the host (9), the port selection unit 3102 changes the subject for which the port flag is "ON" from the port C to the port F which was selected in the step S1804 (refer to FIG. 22A).

In the next step S1806, along with the processing of the step S1805, as shown in FIG. 22B, the port selection unit 3102 reduces the number of I/O hosts for the port C by 1 (i.e. changes it from "1" to no value), and increases the number of I/O hosts for the port F by 1 (i.e. changes it from "2" to "3").

And, in the next step S1807, the port notification unit 3103 notifies information related to the port F which was selected in the step S1806 (for example the port ID "F") to the host (9). Due to this, the host (9) is able to change over the path which is being used as an I/O path to a path which is related to the "normal" port F.

When the processing described above has terminated, the result of the decision in the step S1802 becomes YES, and the flow of control is transferred to a step S1901 shown in FIG. 19.

In this step S1901, the maintenance task for CHA (1) is performed. For example, CHA (1) may be changed over.

In the next step S1902, on the basis of actuation by a maintenance person upon the input and output console (not shown in the drawings), the status detection unit 3101 updates the port statuses of the ports A through D from "2" (maintenance) to "0" ("normal") (refer to FIG. 23A). To put this in another manner, the statuses of the ports A through D are manually updated by the maintenance person to "0" ("normal"). It should be understood that, instead of this manual updating, it would also be acceptable, for example, to detect that CHA (1) has been replaced, and for the status detection unit 3101 to update the statuses of the ports A through D to "0" ("normal").

In the next step S1903, the port selection unit 3102 decides whether or not a condition A is satisfied. This condition A is that "the processing from the step S1904 onwards has been performed for the ports A through D for which maintenance has been completed and for which the port status has been updated from "2" to "0" (more precisely, for the valid ports A through C)". If the result of the decision in this step S1903 is negative (NO in the step S1903), then the flow of control proceeds to a step S1904, whereas if the result of the decision in this step S1903 is affirmative (YES in the step S1903), then this processing terminates.

In the next step S1904, the port selection unit 3102 decides whether or not a condition B is satisfied. This condition B is that "the processing from the step S1905 onwards has been performed for all of the hosts which can use, as an I/O path, a path which is related to a port (for example, the port A) for which maintenance has been completed and which has not yet been processed". If the result of the decision in this step S1904 is negative (NO in the step S1904), then the flow of control proceeds to a step S1905, whereas if the result of the decision in this step S1904 is affirmative (YES in the step S1904), then the flow of control returns back to the step S1903.

In the next step S1905, the port selection unit 3102 selects, from the subject hosts in the subject host group which have not yet been processed, that subject host for which the total number of paths is the fewest. Here, if the ports for which maintenance has been completed but which have not yet been processed by the step S1904 are taken as being the port A, then the "subject hosts" are the hosts (1), (4), (7), (8), and (9) which can use paths related to the port A as I/O paths (i.e., for which a priority is set for the port A). The host (1) is selected, since, for example, the total number of paths is least for the host (1).

In the next step S1906, the port selection unit 3102 decides whether or not a condition C is satisfied. This condition C is that "C1 is larger than C2 (i.e. C1>C2)". C1 is "the number of hosts which correspond to the port related to the path which is being used by the subject host, selected by the step S1905, as the current I/O path (i.e. the port for which the port flag is "ON"; hereinafter, the "current port"); in concrete terms this is, for example, the number "3" of I/O hosts which correspond to the current port E of the host (1). On the other hand, C2 is "the total obtained by adding 1 to the number of I/O hosts which correspond to the port which is the subject of processing and for which maintenance has been completed"; in concrete terms this is, for example, the total obtained "1" by adding 1 to the number "0" of I/O hosts corresponding to the port A. In this example, since the condition C is satisfied, the result of the decision in this step S1906 is affirmative (YES in the step S1906), and then the flow of control proceeds to the step S1907 (whereas, if the result of the decision in the step S1906 is negative (NO in the step S1906) then the flow of control is transferred to the step S1903). By deciding whether or not this condition C is satisfied, it is possible to avoid performing useless changeover of the ports, in a case such as when, even if changing over of the ports is performed, equalization of the number of I/O hosts is not enhanced.

In the next step S1907, the port selection unit 3102 decides whether or not a condition D is satisfied. This condition D is that "for the subject host, the priority of the port which is the subject of processing and for which maintenance has been completed is higher than the priority of the current port". In this example since, for the subject host (1), the priority of the port A for which maintenance has been completed is higher than that of the current port E, accordingly this condition D is satisfied, and consequently the result of the decision in this step S1907 is affirmative (YES in the step S1907), and the flow of control proceeds to a step S1908 (whereas, if the result of the decision in this step S1907 is negative (NO in the step S1907) then the flow of control is transferred to the step S1904).

In the next step S1908, for the host (1), the port selection unit 3102 changes the subject for which the port flag is "ON" from the port E to the port A which is the processing subject for which maintenance has been completed (refer to FIG. 23B).

In the next step S1909, along with the processing of the step S1908, as shown in FIG. 24A, the port selection unit 3102 reduces the number of I/O hosts for the port C by 1 (i.e. changes it from "3" to "2"), and increases the number of I/O hosts for the port A which is the processing subject and for which maintenance has been completed by 1 (i.e. changes its value from "none" to "1").

In the next step S1910, the port notification unit 3103 notifies information related to the port A for which maintenance has been completed (for example its port ID "A") to the host (1). Due to this, the host (1) is able to change over the path which is being used as an I/O path to a path which is related to the port A for which maintenance has been completed.

After the step S1910 has been performed for the host (1), then the step S1905 is performed, and here, for example, the host (4) is selected. For the host (4), the result of the decision of the step S1906 is negative. The reason why is that the number of I/O hosts "2" for the current port E is not greater than the total value obtained by adding 1 to the number of I/O hosts "1" of the port A which is the subject of processing and for which maintenance has been completed. Due to this, the step S1903 is performed.

Since the ports B and C for which effective maintenance has been completed remain, the result of the decision in the step S1903 is negative. For this reason, the step S1904 is performed for the port B whose maintenance has been completed, and then the step S1905 is performed since the result of the decision of the step S1904 is negative.

In this step S1905, for the port B whose maintenance has been completed, the port selection unit 3102 selects, from among the subject hosts (2), (5), (7), (8), and (9), for example, the host (2) as being that host for which the total number of paths is the fewest.

In the next step S1906, the port selection unit 3102 decides whether or not the condition C is satisfied. In this example since, for the host (2), the number of I/O hosts "3" which corresponds to the current port F is larger than the total obtained by adding 1 to the number of I/O hosts which corresponds to the port B which is the subject of processing and for which maintenance has been completed, accordingly, by the condition C being satisfied, the result of the decision in the step S1906 is affirmative, so that the flow of control proceeds to a step S1907.

In this step S1907, the port selection unit 3102 makes a decision as to whether or not the condition D is satisfied. Since in this example, for the host (2), the priority of the port B for which maintenance has been completed is higher than that of the current port F, accordingly the condition D is satisfied, and consequently the result of this decision in this step S1907 is affirmative, and the flow of control proceeds to a step S1908.

In this step S1908, for the host (2), the port selection unit 3102 changes the subject for which the port flag is "ON" from the port F to the port B which is the subject of processing and for which maintenance has been completed (refer to FIG. 24B).

In the next step S1909, along with the processing of the step S1908, as shown in FIG. 25A, the port selection unit 3102 reduces the number of I/O hosts for the current port F by 1 (i.e. changes it from "3" to "2"), and increases the number of I/O hosts for the port B which is the processing subject and for which maintenance has been completed by 1 (i.e. changes its value from "none" to "1").

In the next step S1910, the port notification unit 3103 notifies information related to the port B for which maintenance has been completed (for example its port ID "B") to the host (2). Due to this, the host (2) is able to change over the path which is being used as an I/O path to a path which is related to the port B for which maintenance has been completed.

After the step S1910 has been performed for the host (2), then the step S1905 is performed, and here, for example, the host (5) is selected. For the host (5), the result of the decision of the step S1906 is negative. The reason why is that the number of I/O hosts "2" for the current port F is not greater than the total value obtained by adding 1 to the number of I/O hosts "1" of the port B which is the subject of processing and for which maintenance has been completed. Due to this, the step S1903 is performed.

Since the port C for which effective maintenance has been completed remains, the result of the decision in the step S1903 is negative. For this reason, the step S1904 is performed for the port C whose maintenance has been completed, and then the step S1905 is performed since the result of the decision of the step S1904 is negative.

In this step S1905, for the port C whose maintenance has been completed, the port selection unit 3102 selects, from among the subject hosts (3), (6), (7), (8), and (9), for example, the host (3) as being that host for which the total number of paths is the fewest.

In the next step S1906, the port selection unit 3102 decides whether or not the condition C is satisfied. In this example since, for the host (3), the number of I/O hosts "3" which corresponds to the current port G is larger than the total obtained by adding 1 to the number of I/O hosts which corresponds to the port C which is the subject of processing and for which maintenance has been completed, accordingly, due to the condition C being satisfied, the result of the decision in the step S1906 is affirmative, so that the flow of control proceeds to the step S1907.

In this step S1907, the port selection unit 3102 makes a decision as to whether or not the condition D is satisfied. Since in this example, for the host (3), the priority of the port C for which maintenance has been completed is higher than that of the current port G, accordingly the condition D is satisfied, and consequently the result of this decision in this step S1907 is affirmative, and the flow of control proceeds to the step S1908.

In this step S1908, for the host (3), the port selection unit 3102 changes the subject for which the port flag is "ON" from the port G to the port C which is the subject of processing and for which maintenance has been completed (refer to FIG. 25B).

In the next step S1909, along with the processing of the step S1908, as shown in FIG. 26, the port selection unit 3102 reduces the number of I/O hosts for the current port G by 1 (i.e. changes it from "3" to "2"), and increases the number of I/O hosts for the port C which is the subject of processing and for which maintenance has been completed by 1 (i.e. changes its value from "none" to "1").

In the next step S1910, the port notification unit 3103 notifies information related to the port C for which maintenance has been completed (for example its port ID "C") to the host (3). Due to this, the host (3) is able to change over the path which is being used as an I/O path to a path which is related to the port C for which maintenance has been completed.

After the step S1910 has been performed for the host (3), then the step S1905 is performed, and here, for example, the host (6) is selected. For the host (6), the result of the decision of the step S1906 is negative. The reason why is that the number of I/O hosts "2" for the current port G is not greater than the total value obtained by adding 1 to the number of I/O hosts "1" of the port C which is the subject of processing and for which maintenance has been completed. Due to this, the step S1903 is performed.

Since no valid port remains for which maintenance has been completed, accordingly the result of the decision in the step S1903 is affirmative. For this reason, processing is terminated.

Figure 27:
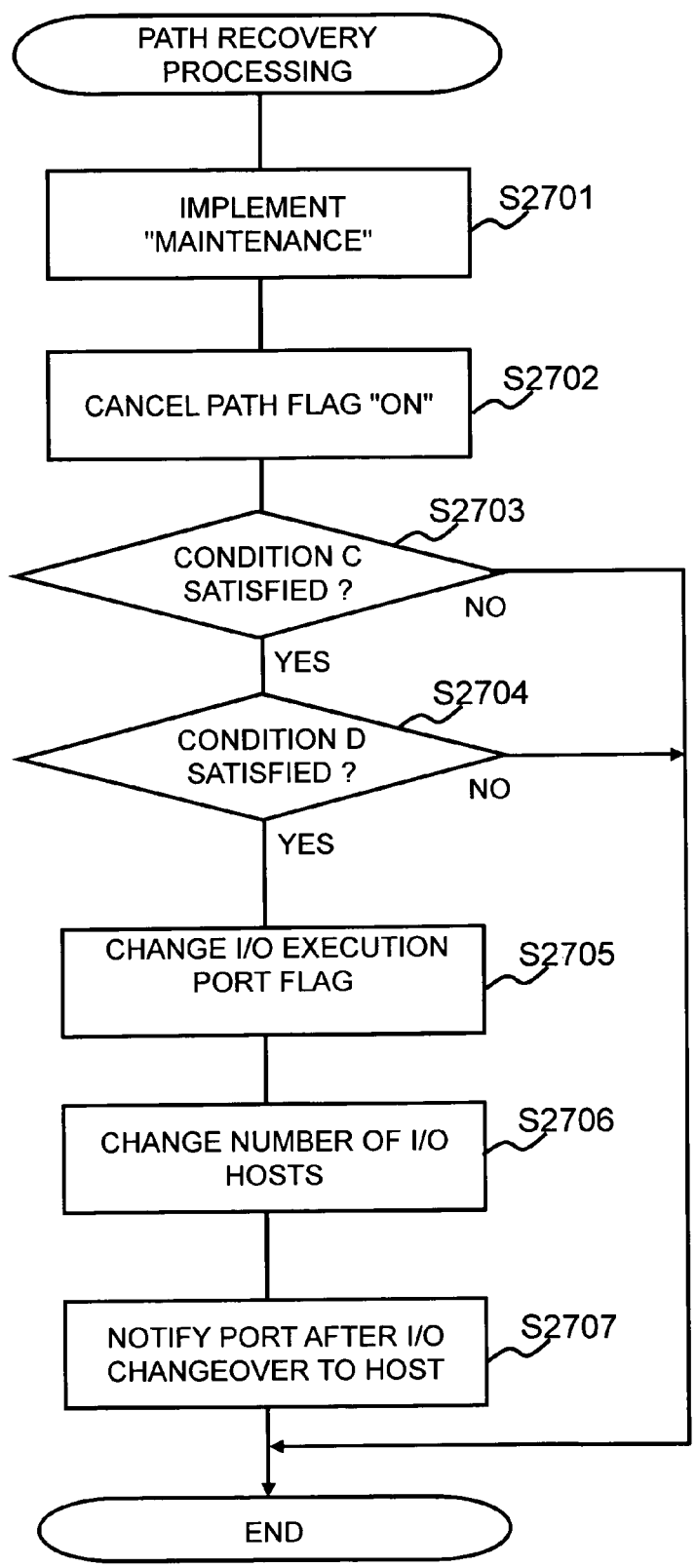
FIG. 27 shows a flow of processing for path recovery.

FIG. 27 shows the flow of the path recovery processing. It should be understood that FIG. 28A shows the port information table before the flow shown in FIG. 27. According to FIG. 28A, for the host (4), a path fault is being detected on a path related to the port E.

In a step S2701, due to the maintenance, for the host (4), the path fault on the path related to the port E is cancelled.

In the next step S2702, on the basis of actuation of the input and output console (not shown in the figures) by a maintenance person, for the host (4), the status detection unit 3101 cancels the path flag "ON" which corresponds to the port E (refer to FIG. 28B).

In the next step S2703, the port selection unit 3102 makes a decision as to whether or not the condition C is satisfied. In this example since, for the host (4), the number of I/O hosts "3" which corresponds to the current port A is larger than the total obtained by adding 1 to the number of I/O hosts which corresponds to the port E for which maintenance has been completed, accordingly the condition C is satisfied, so the result of the decision in the step S2703 is affirmative (YES in the step S2703), and the flow of control proceeds to a step S2704 (if the result of the decision in the step S2703 were to be negative (NO in the step S2703), then processing would terminate).

In the step S2704, the port selection unit 3102 makes a decision as to whether or not the condition D is satisfied. Since in this example, for the host (4), the priority of the port E for which maintenance has been completed is higher than that of the current port A, accordingly the condition D is satisfied, and consequently the result of this decision in this step S1907 is affirmative (YES in the step S2704) and the flow of control proceeds to the step S2705 (if the result of the decision in the step S2703 were to be negative (NO in the step S2704), then processing would terminate).

In the next step S2705, for the host (4), the port selection unit 3102 changes the subject for which the port flag is "ON" from the port A to the port E for which maintenance has been completed (refer to FIG. 29A).

In the next step S2706, along with the processing of the step S2705, as shown in FIG. 29B, the port selection unit 3102 reduces the number of I/O hosts for the current port A by 1 (i.e. changes it from "3" to "2"), and increases the number of I/O hosts for the port E for which maintenance has been completed by 1 (i.e. changes its value from "none" to "1").

In the next step S2707, the port notification unit 3103 notifies information related to the port E for which maintenance has been completed (for example its port ID "E") to the host (4). Due to this, the host (4) is able to change over the path which is being used as an I/O path to a path which is related to the port E for which maintenance has been completed.

The above is the flow of the path recovery processing. It should be understood that in this path recovery processing, if for example, as shown in FIG. 30A, the port which is related to the path upon which a path fault is occurring is, for example, the port A for the host (1), then, in the step S2702, after having cancelled the path flag "ON" (refer to FIG. 30B), the result of the decision in the step S2703 becomes negative, so that processing terminates. The reason why is that the condition C is not satisfied, since, for the host (1), the number of I/O hosts "2" which corresponds to the current port E is not greater than the total obtained by adding 1 to the number of I/O hosts "1" corresponding to the port A for which maintenance has been completed.

Figure 32:
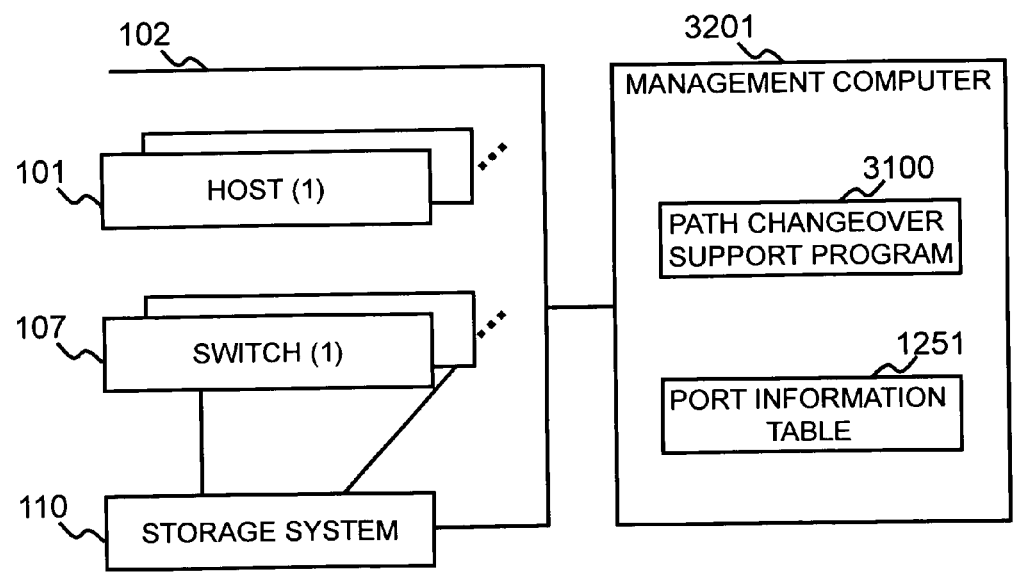
FIG. 32 shows a variant embodiment of the computer system according to the present invention.

Although a preferred embodiment of the present invention has been explained, the present invention is not to be considered as being limited to this embodiment; it goes without saying that various changes are possible, provided that the gist of the present invention is not departed from. For example, it would also be acceptable for the path changeover support program 3100 or the port information table 1251 to be provided to some device other than the storage system 110, for example, as shown in FIG. 32, to a management computer 3201 (for example a management server) which is connected to the host 101 and the storage system 110. In this case, the path changeover support program 3100 would be executed by a CPU within this management computer 3201.

The invention claimed is:

1. In a system in which a plurality of paths extend between a plurality of ports possessed by a storage system and one or more external devices, the plurality of paths including a path which is being used as an I/O path and one or more paths which are being used as alternate paths, and with the path which is being used as an I/O path being a path which is used when the external device issues an I/O command, and the path which is used as an alternate path being capable of being used as an I/O path:

a path changeover support device, comprising:
   a storage resource which stores port management information including information related to a status for each of a plurality of ports possessed by the storage system;
   a status detection unit which detects that a fault is occurring in an I/O path which is using a first port;
   a port selection unit which extracts a subject external device which are using the first port in the I/O path, selects a "normal" port from one or more ports related to one or more paths which are being connected to the subject external device; and a port notification unit which notifies the subject external device of information of the selected "normal" port, wherein the "normal" port is selected in order for the number of the external devices for all of the ports, except the first port, used in the I/O paths to become as equal as possible, wherein, if it has been detected by the status detection unit that recovery has been performed from a path fault, the port selection unit performs (1-1) and (1-2) below in relation to a subject external device which is using the path which has been recovered from the path fault:

(1-1) on the basis of the port management information, deciding whether or not the number of I/O paths related to the current I/O port, which is the port related to the path which is being used as the current I/O path, is greater than the sum of 1 and the number of I/O paths related to the "maintenance completed" port, which is the port related to the path which has been recovered from the path fault; and (1-2) updating the port management information, if the result of the decision is affirmative.

2. The path changeover support device according to claim 1, wherein, if it has been detected that a fault has occurred in the I/O path which is using the first port, and two or more subject external devices use the first port in the I/O path, the port selection unit selects the selected port in ascending order from that subject external device for which the total number of paths is the least.

3. The path changeover support device according to claim 2, wherein, if there are two or more "normal" ports in a plurality of ports related to a plurality of alternate paths, the port selection unit selects one "normal" port from the two or more "normal" ports, so that the number of I/O paths for each of the plurality of ports become as equal as possible.

4. The path changeover support device according to claim 1, wherein, the if there are two or more "normal" ports in a plurality of ports related to a plurality of alternate paths, the port selection unit selects one "normal" port from the two or more "normal" ports, so that the numbers of I/O paths for each of the plurality of ports become as equal as possible.

5. The path changeover support device according to claim 1, wherein, if there are two or more "normal" ports in a plurality of ports related to a plurality of alternate paths, the port selection unit selects one "normal" port which is having the highest priority from the two or more "normal" ports.

6. The path changeover support device according to claim 1, wherein, if it has been detected that a port fault is occurring at some port, then, among two or more subject external devices which are using an anomalous path related to the first port as an I/O path, the port selection unit performs (7-1) and (7-2) below in relation to these subject external devices, in order from the one whose total number of paths is the least:

(7-1) on the basis of the port management information, selecting a "normal" port from one or more ports related to one or more paths which are being used as alternate paths; and (7-2) updating the port management information based on information of the selected "normal" port selected in (7-1);

wherein the total number of paths is the total number of paths which connect to external devices.

7. The path changeover support device according to claim 1, wherein, if it has been detected that a path fault is occurring upon some path, the port selection unit updates the port management information to information which specifies that this path is faulty, and performs (8-1) and (8-2) below in relation to a subject external device which is using the anomalous path related to the path fault as an I/O path:

(8-1) on the basis of the port management information, selecting a "normal" port from one or more ports related to one or more paths which are being used as alternate paths; and (8-2) updating the port management information based on information of the selected "normal" port selected in (8-1);

wherein a faulty path is a path which has become impossible to use for some reason other than a port fault, wherein the total number of paths is the total count of I/O paths and alternate paths.

8. The path changeover support device according to claim 1, wherein, if the result of the decision in (1-1) above is affirmative, the port selection unit decides whether or not the priority of the current I/O port is higher than the priority of the "maintenance completed" port, and does not execute (1-2) above if the result of that decision is affirmative.

9. The path changeover support device according to claim 1, wherein, if it has been detected that the status of some port has become "maintenance", then, among two or more subject external devices which are using an anomalous path related to "maintenance" as an I/O path, the port selection unit performs (11-1) and (11-2) below in relation to these subject external devices, in order from the one whose total number of paths is the least:

(11-1) on the basis of the port management information, selecting a "normal" port from one or more ports related to one or more paths which are being used as alternate paths; and (11-2) updating the port management information based on information of the selected "normal" port selected in (11-1);

wherein the total number of paths is the total count of I/O paths and alternate paths.

10. The path changeover support device according to claim 9, wherein, if it has been detected by the status detection unit that the status of a port has returned from "maintenance" to "normal", then, for each "maintenance completed" port whose status has returned from "maintenance" to "normal", among two or more subject external devices which are using a path related to a "maintenance completed" port as an alternate path, the port selection unit performs (12-1) and (12-2) below in relation to these subject external devices, in order from the one whose total number of paths is the least:

(12-1) on the basis of the port management information, deciding whether or not the number of I/O paths related to the current I/O port, which is the port related to the path which is being used as the current I/O path, is greater than the sum of 1 and the number of I/O paths related to the "maintenance completed" port; and (12-2) updating the port management information, if the result of the decision in (12-1) is affirmative.

11. The path changeover support device according to claim 10, wherein, if the result of the decision in the (12-1) is affirmative, the port selection unit decides whether or not the priority of the current I/O port is higher than the priority of the port upon which maintenance has been completed, and does not perform the (12-2) if the result of that decision is affirmative.

12. For a system in which a plurality of paths extend between a plurality of ports possessed by a storage system and one or more external devices, the plurality of paths including a path which is being used as an I/O path and one or more paths which are being used as alternate paths, and with the path which is being used as an I/O path being a path which is used when the external device issues an I/O command, and the path which is used as an alternate path being capable of being used as an I/O path:
  a path changeover support method, comprising:
  detecting that a fault is occurring in an I/O path which is using a first port;
  extracting a subject external device which are using the first port in the I/O path;
  selecting a "normal" port from one or more ports related to one or more paths which are being connected to the subject external device; and
  notifying to the subject external device of information of the selected "normal" port,
  wherein the "normal" port is selected in order for the number of the external devices for all of the ports, except the first port, used in the I/O paths to become as equal as possible,
  wherein, if it has been detected that recovery has been performed from a path fault, performing (14-1) and (14-2) below in relation to a subject external device which is using the path which has been recovered from the path fault:
(14-1) on the basis of the port management information, deciding whether or not the number of I/O paths related to the current I/O port, which is the port related to the path which is being used as the current I/O path, is greater than the sum of 1 and the number of I/O paths related to the "maintenance completed" port, which is the port related to the path which has been recovered from the path fault; and
(14-2) updating the port management information, if the result of the decision is affirmative.

\* \* \* \* \*